US012804581B2

(12) United States Patent
Berntorp et al.

(10) Patent No.: US 12,804,581 B2
(45) Date of Patent: Nov. 17, 2026

(54) DISTRIBUTED ESTIMATION SYSTEM

(71) Applicant: Mitsubishi Electric Research Laboratories, Inc., Cambridge, MA (US)

(72) Inventors: Karl Berntorp, Newton, MA (US); Marcus Greiff, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 504 days.

(21) Appl. No.: 17/655,446

(22) Filed: Mar. 18, 2022

(65) Prior Publication Data

US 2023/0300774 A1 Sep. 21, 2023

(51) Int. Cl.
*H04W 64/00* (2009.01)

(52) U.S. Cl.
CPC .................................. *H04W 64/00* (2013.01)

(58) Field of Classification Search
CPC ..................................................... H04W 64/00
See application file for complete search history.

(56) References Cited

U.S. PATENT DOCUMENTS 9,476,990 B2 * 10/2016 Kim ........................ G01S 19/51
2020/0003907 A1 * 1/2020 Eriksson .................. G08G 1/22

* cited by examiner

*Primary Examiner* — Natasha W Cosme
(74) *Attorney, Agent, or Firm* — Gene Vinokur

(57) ABSTRACT

A hybrid distributed estimation system (DES) jointly tracks states of a plurality of moving devices configured to transmit measurements indicative of a state of a moving device and an estimation of the state of the moving device derived from the measurements. The hybrid DES selects between the measurements and the estimations, and based on this selection activates different types of DESs configures to jointly track the states of the moving devices using different types of information. Next, the hybrid DES tracks the states using the activated DES allowing track the state by different DES at different instances of time.

20 Claims, 28 Drawing Sheets

| Notation | Description | Unit |
|---|---|---|
| $P$ | Code observation | m |
| $\rho$ | Distance between the receiver and the satellite | m |
| $c$ | Speed of light | m/s |
| $\delta T$ | Receiver clock bias | s |
| $\delta t$ | Satellite clock bias | s |
| $I$ | Ionospheric delay | m |
| $T$ | Tropospheric delay | m |
| $\epsilon$ | Code observation noise | m |
| $\lambda$ | Carrier wavelength | m |
| $\Phi$ | Carrier phase observation | cycles |
| $n$ | Integer ambiguity | cycles |
| $\eta$ | Carrier observation noise | m |

FIG. 9B

DISTRIBUTED ESTIMATION SYSTEM

TECHNICAL FIELD

This invention relates generally to distributed estimation systems (DESs), and more particularly to jointly tracking states of a plurality of moving devices wherein each of the moving devices is configured to transmit to the hybrid DES over a wireless communication channel.

BACKGROUND

A Global Navigation Satellite System (GNSS) is a system of satellites that can be used for determining the geographic location of a mobile receiver with respect to the earth. Examples of a GNSS include GPS, Galileo, Glonass, QZSS, and BeiDou. Various global navigation satellite (GNS) correction systems are known that are configured for receiving GNSS signal data from the GNSS satellites, for processing these GNSS data, for calculating GNSS corrections from the GNSS data, and for providing these corrections to a mobile receiver, with the purpose of achieving quicker and more accurate calculation of the mobile receiver's geographic position.

Various position estimation methods are known wherein the position calculations are based on repeated measurement of the so-called pseudo-range and carrier phase observables by Earth-based GNSS receivers. The "pseudo-range" or "code" observable represents a difference between the transmit time of a GNSS satellite signal and the local receive time of this satellite signal, and hence includes the geometric distance covered by the satellite's radio signal. The measurement of the alignment between the carrier wave of the received GNSS satellite signal and a copy of such a signal generated inside the receiver provides another source of information for determining the apparent distance between the satellite and the receiver. The corresponding observable is called the "carrier phase", which represents the integrated value of the Doppler frequency due to the relative motion of the transmitting satellite and the receiver.

Any pseudo-range observation comprises inevitable error contributions, among which are receiver and transmitter clock errors, as well as additional delays caused by the non-zero refractivity of the atmosphere, instrumental delays, multipath effects, and detector noise. Any carrier phase observation additionally comprises an unknown integer number of signal cycles, that is, an integer number of wavelengths, that have elapsed before a lock-in to this signal alignment has been obtained. This number is referred to as the "carrier phase ambiguity". Usually, the observables are measured, i.e. sampled, by a receiver at discrete consecutive times. The index for the time at which an observable is measured is referred to as an "epoch". The known position determination methods commonly involve a dynamic numerical value estimation and correction scheme for the distances and error components, based on measurements for the observables sampled at consecutive epochs.

When GNSS signals are continuously tracked and no loss-of-lock occurs, the integer ambiguities resolved at the beginning of a tracking phase can be kept for the entire GNSS positioning span. The GNSS satellite signals, however, may be occasionally shaded (e.g., due to buildings in "urban canyon" environments), or momentarily blocked (e.g., when the receiver passes under a bridge or through a tunnel). Generally, in such cases, the integer ambiguity values are lost and must be re-determined. This process can take from a few seconds to several minutes. In fact, the presence of significant multipath errors or unmodeled systematic biases in one or more measurements of either pseudo-range or carrier phase may make it difficult with present commercial positioning systems to resolve the ambiguities. As the receiver separation (i.e., the distance between a reference receiver and a mobile receiver whose position is being determined) increases, distance-dependent biases (e.g. orbit errors and ionospheric and tropospheric effects) grow, and, as a consequence, reliable ambiguity resolution (or re-initialization) becomes an even greater challenge. Furthermore, loss-of-lock can also occur due to a discontinuity in a receiver's continuous phase lock on a signal, which is referred to as a cycle slip. For instance, cycle slips can be caused by a power loss, a failure of the receiver software, or a malfunctioning satellite oscillator. In addition, cycle slip can be caused by changing ionospheric conditions.

GNSS enhancement refers to techniques used to improve the accuracy of positioning information provided by the Global Positioning System or other global navigation satellite systems in general, a network of satellites used for navigation. For example, some methods use differencing techniques based on differencing between satellites, differencing between receivers, differencing between epochs, and combination thereof. Single and double differences between satellites and the receivers reduce the error sources but do not eliminate them.

Consequently, there is a need to increase the accuracy of GNSS positioning. To address this problem, a number of different methods use the cooperation of multiple GNSS receivers to increase the accuracy of GNSS positioning. However, to properly cooperate, the multiple GNSS receivers need to be synchronized and their operation needs to be constrained. For example, U.S. Pat. No. 9,476,990 describes cooperative GNSS positioning estimation by multiple mechanically connected modules. However, such a restriction on the cooperative enhancement of accuracy of GNSS positioning is not always practical.

SUMMARY

Some embodiments are based on the realization that current methods of tracking of a state of a moving device, such as a vehicle, assume either an individual or centralized estimation based on internal modules of the vehicle or a distributed estimation that performs the state estimation in a tightly controlled and/or synchronized manner. Examples of such distributed estimation include decentralized systems that determine different aspects of the state tracking and estimate the state of the vehicle by reaching a consensus, imbalanced systems that track the state of the system independently while one type of tracking is dominant over the other, and distributed systems including multiple synchronized receivers preferably located at a fixed distance from each other.

Some embodiments appreciate the advantages of cooperative state tracking when internal modules of a moving vehicle use some additional information determined externally. However, some embodiments are based on the recognition that such external information is not always available. Hence, there is a need for cooperative, tracking, when the tracking is performed by the internal modules of the vehicle but can seamlessly integrate the external information when such information is available.

Some embodiments are based on the recognition that the cooperative estimation can either be performed at a central computing node, or the estimation can be performed completely decentralized, or it can be a distributed combined approach. Some embodiments are based on the recognition that different applications require different types of information, and furthermore, that even if an application at a particular time step can make optimal use of a type of information, such optimal type of information can change from a time step to a next time step.

To that end, some embodiments disclose a hybrid distributed estimation system (HDES) utilizing at least two types of information according to some embodiments. For example, the information utilized by the HDES includes estimates from the local filter executing in each moving device. Additionally or alternatively, the information utilized by the HDES includes measurements for each moving device, which can be obtained using sensors either physically or operatively connected to the moving device. In such a manner, the HDES can select the best information for the current state of the joint tracking. The best type of information to be used by the DES depends on numerous factors, including the type of environment, type of moving device, quality of measurements, quality of estimates, and how long the estimation in the DES and moving devices has been ongoing.

Other embodiments determine whether to execute the DES altogether or revert back to only using local estimates because in certain settings, the DES only makes estimation worse. For example, when the measurement noise between two sensors is correlated, meaning there is a relation between them, but the DES does not know about this, the DES may end up producing estimates with more uncertainty than a local estimator would provide. For example, for particular types of sensors, when the delay in transmitting some measurements to the DES is large in relation to the time the estimator has executed, using estimates Therefore, some embodiments use these and/or other factors to determine which information to be used at particular time steps. Doing in such a manner makes it possible to come up with the best possible estimation at a given time. Additionally or alternatively, some embodiments acknowledge that when switching between the type of information, different DESs have to be used because it is impractical to provide a universal DES that can handle any type of measurement without major alterations. For example, one embodiment switches between a measurement-sharing probabilistic filter and an estimate-sharing consensus-based distributed Kalman filter (DKF).

Accordingly, one embodiment discloses a hybrid distributed estimation system (HDES) for jointly tracking states of a plurality of moving devices, wherein each of the moving devices is configured to transmit to the HDES over a wireless communication channel one or a combination of measurements indicative of a state of a moving device and an estimation of the state of the moving device derived from the measurements.

The HDES includes a memory configured to store a first distributed estimation system (DES) configured upon activation to jointly track the states of the moving devices based on the measurements of the states of the moving devices and a second DES configured upon activation to jointly track the states of the moving devices based on the estimations of the states of the moving devices; a receiver configured to receive over the communication channel multi-type information from the plurality of moving devices, wherein types of the information include one or a combination of a first type for the measurements of the states of the moving devices and a second type for the estimation of the states of the moving devices; a processor configured to select between the first type and the second type of information, activate the first DES or the second DES based on the selected type of the information, and jointly estimate the states of the moving devices using the activated DES; and transmitter configured to transmit to the moving devices over the communication channel at least one or a combination of the selected type of information and the jointly estimated states of the moving devices.

Another embodiment discloses a computer-implemented method for jointly tracking states of a plurality of moving devices, wherein the method uses a processor coupled to a memory storing a first distributed estimation system (DES) configured upon activation to jointly track the states of the moving devices based on the measurements of the states of the moving devices and a second DES configured upon activation to jointly track the states of the moving devices based on the estimations of the states of the moving devices, wherein the processor is coupled with stored instructions implementing the method, wherein the instructions, when executed by the processor carry steps of the method, including receiving over a communication channel multi-type information from the plurality of moving devices, wherein types of the information include one or a combination of a first type for the measurements of the states of the moving devices and a second type for estimation of the states of the moving devices derived from the measurements; selecting between the first type and the second type of information, activate the first DES or the second DES based on the selected type of the information, and jointly estimate the states of the moving devices using the activated DES; and transmitting to the moving devices over the communication channel at least one or a combination of the selected type of information and the jointly estimated states of the moving devices.

BRIEF DESCRIPTION OF THE DRAWINGS

FIG. 9B shows the various variables that are used alone or in combination in the modeling of the motion and/or measurement model according to some embodiments.

DETAILED DESCRIPTION

Figure 1A:
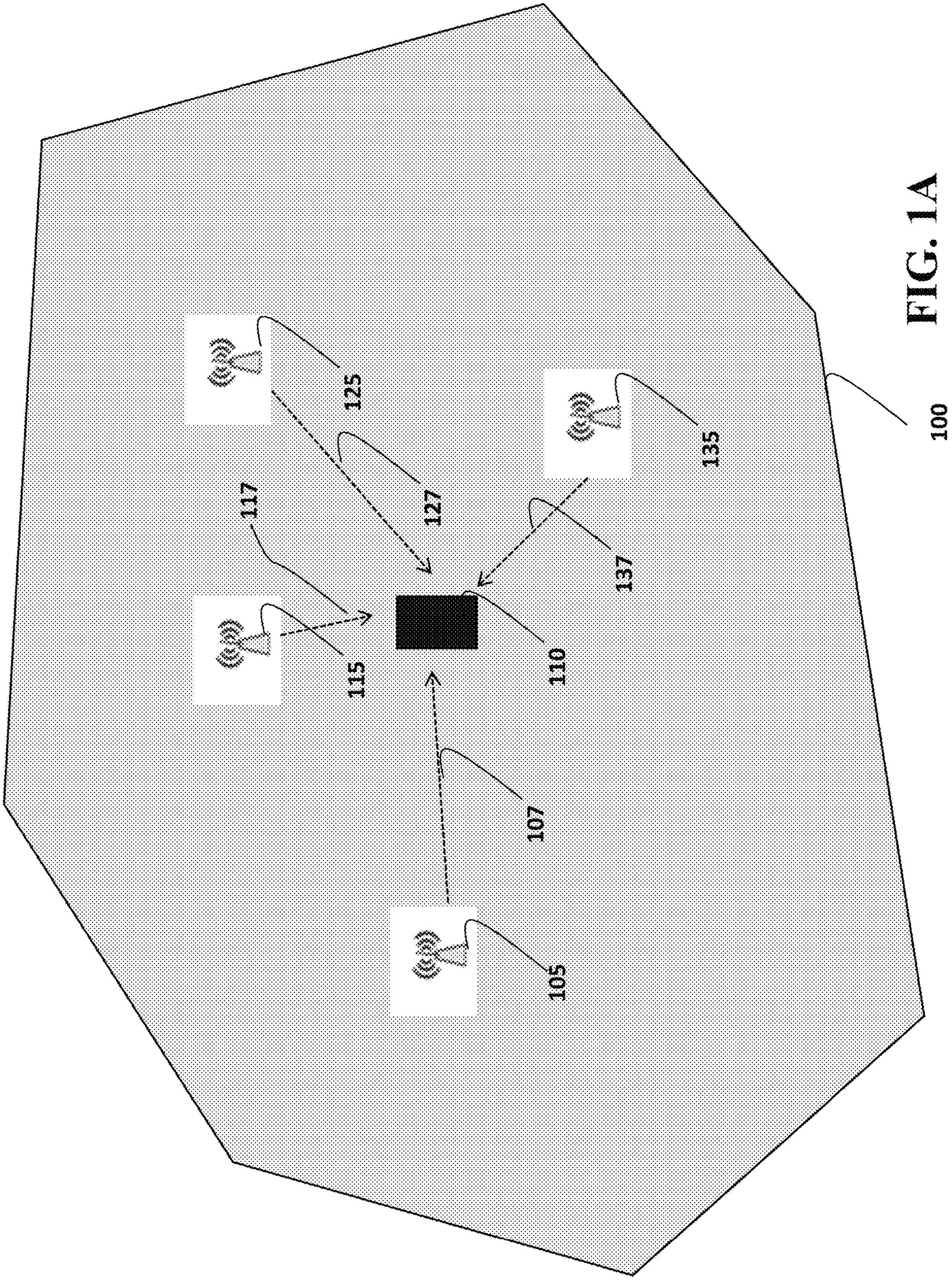
FIG. 1A shows a schematic illustrating some embodiments of the invention.

FIG. 1A shows a schematic illustrating some embodiments of the invention. A moving device 110 moves in an environment 100 that may or may not be known. For example, the environment 100 can be a road network, a manufacturing area, an office space, or a general outdoor environment. For example, the moving device 110 can be any moving device including a road vehicle, air vehicle such as drone, a mobile robot, a cell phone, or a tablet. The moving device 110 is connected to at least one of a set of sensors 105, 115, 125, and 135, which provide data 107, 117, 127, and 137 to the moving device. For example, the data can include environmental information, position information, or speed information, or any other information valuable to the moving device for estimating states of the moving device.

Figure 1B:
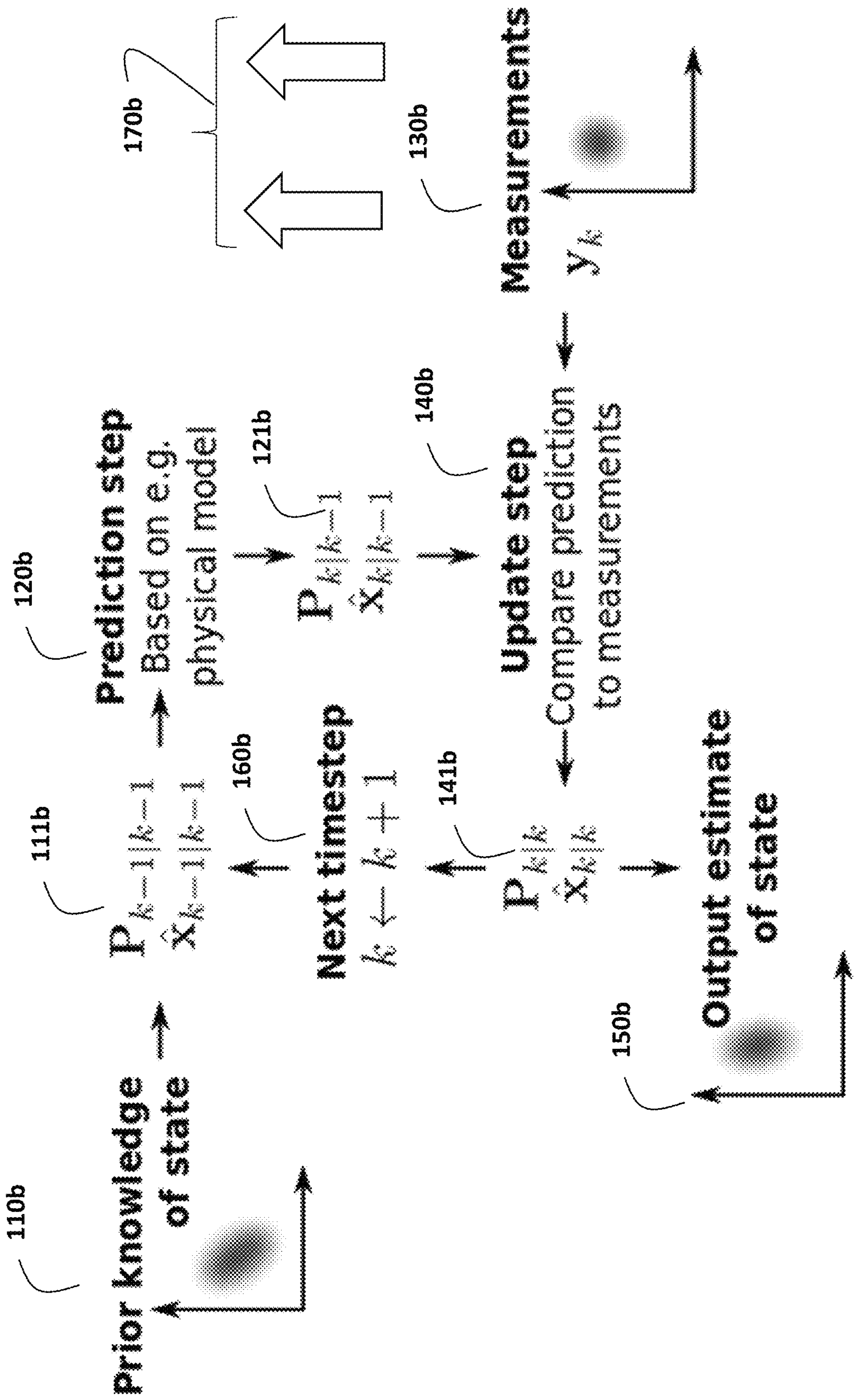
FIG. 1B shows a schematic of the Kalman filter (KF) used by some embodiments for state estimation of a moving device.

FIG. 1B shows a schematic of the Kalman filter (KF) used by some embodiments for state estimation of a moving device. The KF is a tool for state estimation of moving devices 110 that can be represented by linear state-space models, and it is the optimal estimator when the noise sources are known and Gaussian, in which case also the state estimate is Gaussian distributed. The KF estimates the mean and variance of the Gaussian distribution, because the mean and the variance are the two required quantities, sufficient statistics, to describe the Gaussian distribution.

The KF starts with an initial knowledge 110*b* of the state, to determine a mean of the state and its variance 111*b*. The KF then predicts 120*b* the state and the variance to the next time step, using a model of the system, such as the motion model of the vehicle, to obtain an updated mean and variance 121*b* of the state. The KF then uses a measurement 130*b* in an update step 140*b* using the measurement model of the system, wherein the model relates the sensing device data 107, 117, 127, and 137, to determine an updated mean and variance 141*b* of the state. An output 150*b* is then obtained, and the procedure is repeated for the next time step 160*b*.

Some embodiments employ a probabilistic filter including various variants of KFs, e.g., extended KFs (EKFs), linear-regression KFs (LRKFs), such as the unscented KF (UKF). Even though there are multiple variants of the KF, they conceptually function as exemplified by FIG. 1B. Notably, the KF updates the first and second moment, i.e., the mean and covariance, of the probabilistic distribution of interest, using a measurement 130*b* described by a probabilistic measurement model. In some embodiments, the probabilistic measurement model is a multi-head measurement model 170*b* structured to satisfy the principles of measurement updates in the KF according to some embodiments.

Figure 1C:
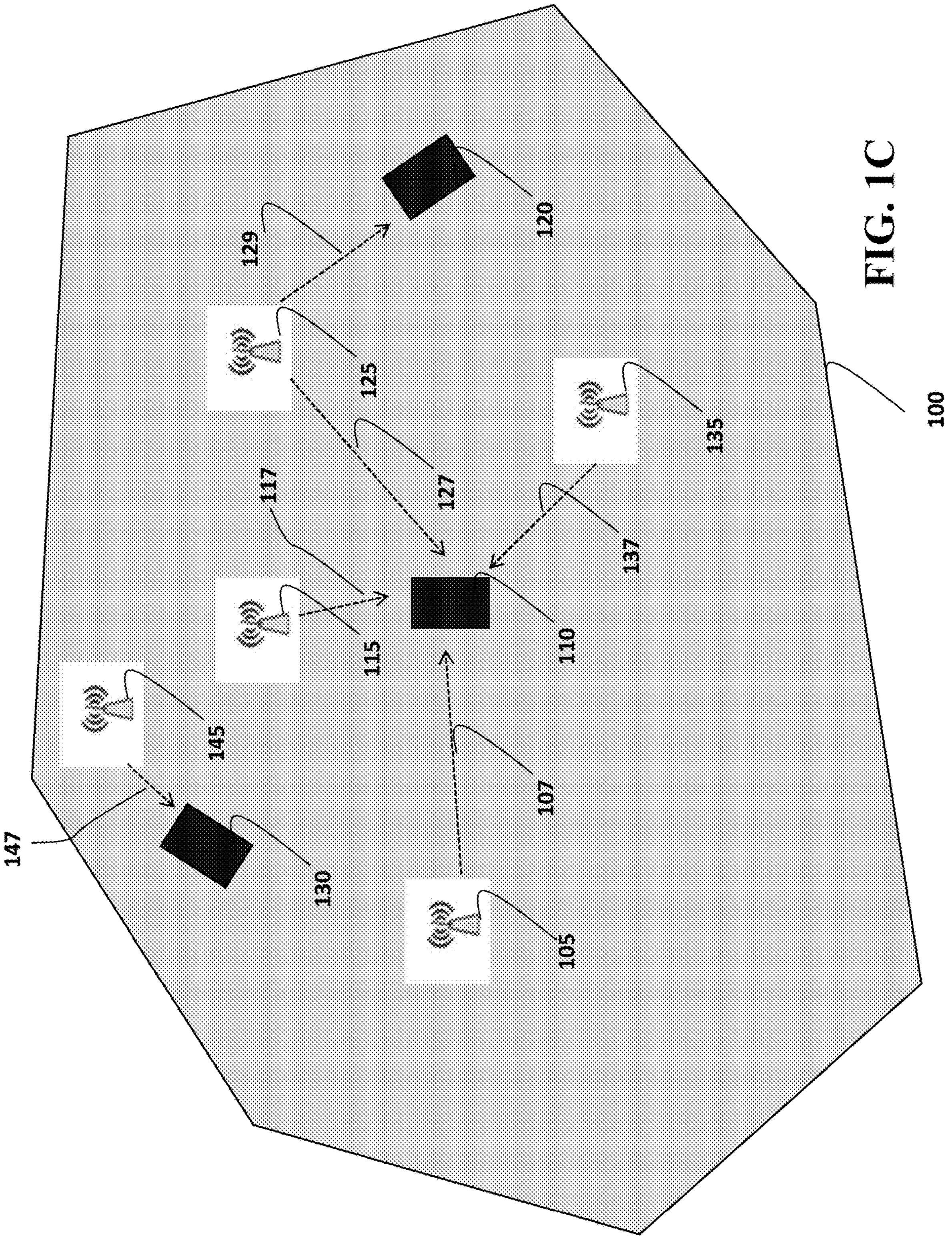
FIGS. 1C and 1D show extensions of the schematic of FIG. 1A when there are additional moving devices.
Figure 1D:
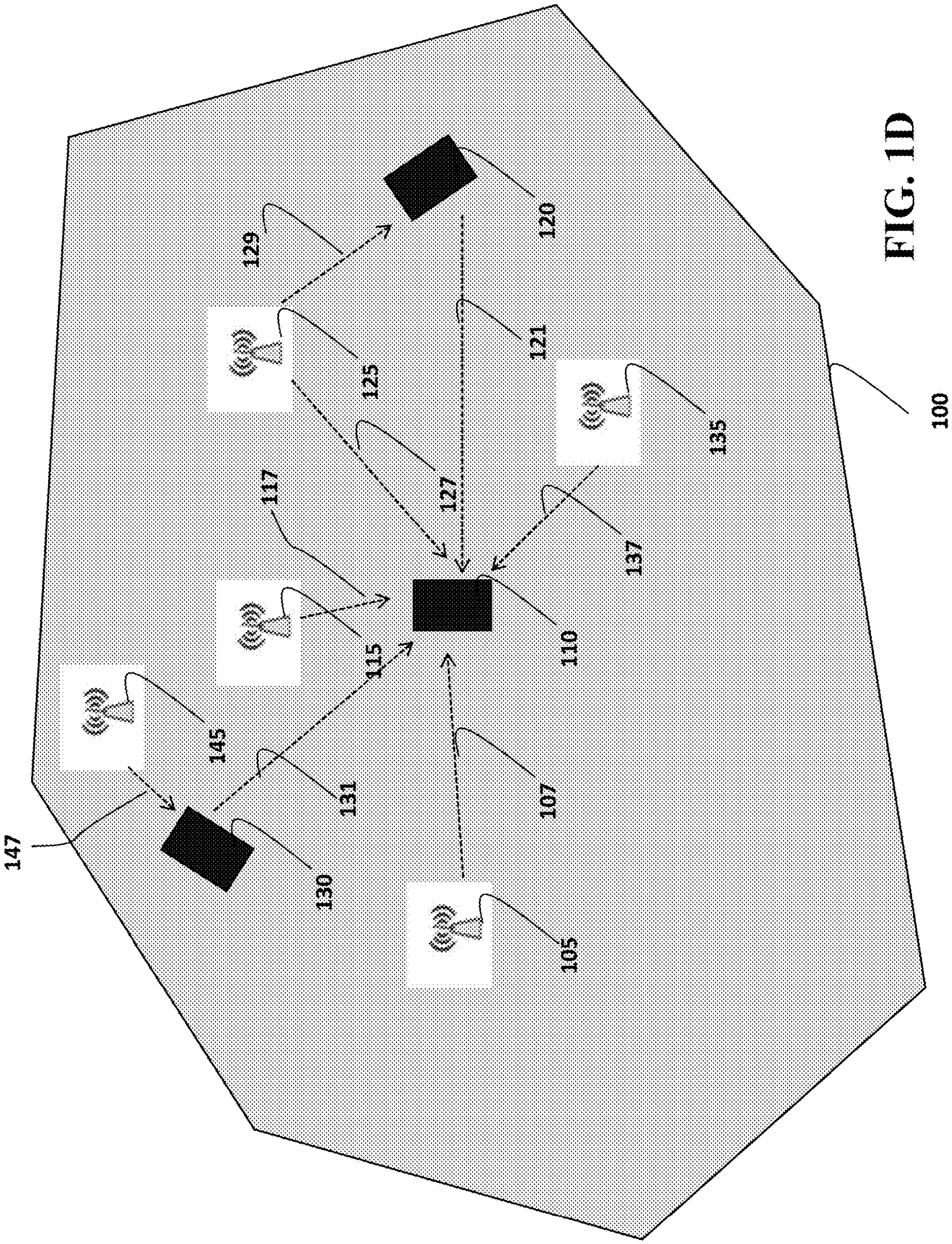

FIGS. 1C and 1D show extensions of schematics of FIG. 1A when there are additional moving devices 120 and 130. Some embodiments are based on the understanding that when having multiple moving devices in the vicinity of each other, there is more information to be gained when merging the total information than when having each moving device using an estimator estimating its own state independently from other moving devices. For instance, 130 gets sensing data 147 from sensor 145 that neither 110 nor 120 receive. Similarly, device 120 receives data 129 from sensor 125 that 130 doesn't receive. Hence, when combining the individual states to have cooperative, or distributed, estimation, the estimation can be improved from when only having individual estimation.

Some embodiments are based on the understanding that moving devices can either perform their estimation locally based on information from the sensors and information also from the surrounding moving devices. For example, device 110 can perform its estimation based on only sensors 105, 115, 125, and 135, additionally or alternatively, it can include the information 131, 121, directly coining from the moving devices.

Some embodiments are based on the recognition that the cooperative estimation can either be performed at a central computing node, the estimation can be performed completely decentralized, or it can be a distributed combined approach.

Figure 2A:
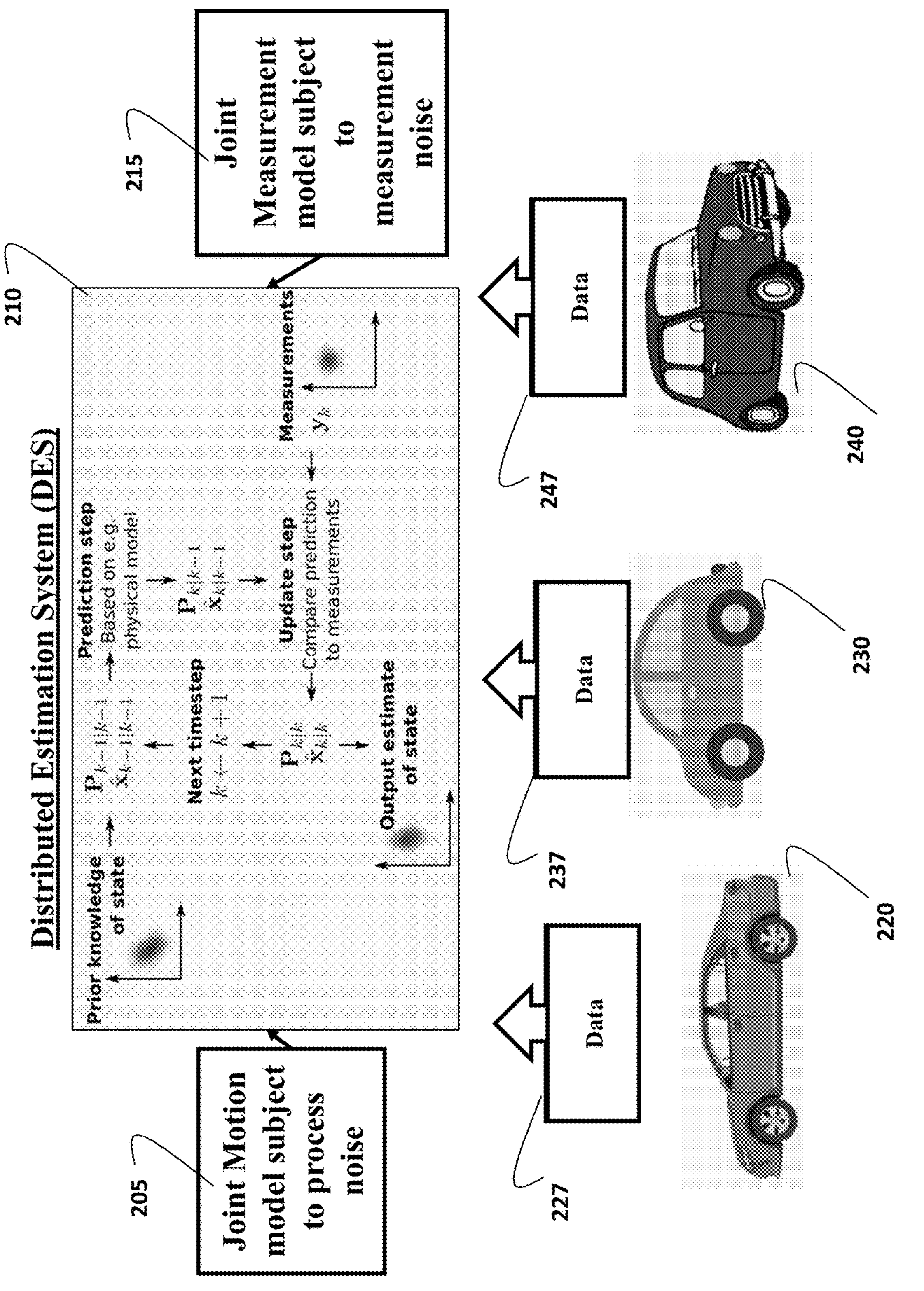
FIG. 2A shows a general schematic of a distributed estimation system (DES) according to some embodiments.

FIG. 2A shows a general schematic of a distributed estimation system (DES) according to some embodiments. The moving devices 220, 230, and 240 transmit data 227, 237, and 247 to a DES 210. The data can have been determined at each moving device, or the data can have been determined by some other entity and the moving device is only redistributing it to the DES. Based on a joint motion model 205 subject to process noise, the DES can predict the time evolution of the states of the moving devices. In addition, based on a joint measurement model 215 subject to measurement noise, the DES updates the states based on the data 227, 237, and 247 received from the moving device, wherein the predicting and updating can be performed analogously to the principles illustrated with FIG. 1B.

Some embodiments are based on the recognition that different applications require different types of information, and furthermore, that even if an application at a particular time step can make optimal use of a type of information, such optimal type of information can change from a time step to a next time step.

Figure 2B:
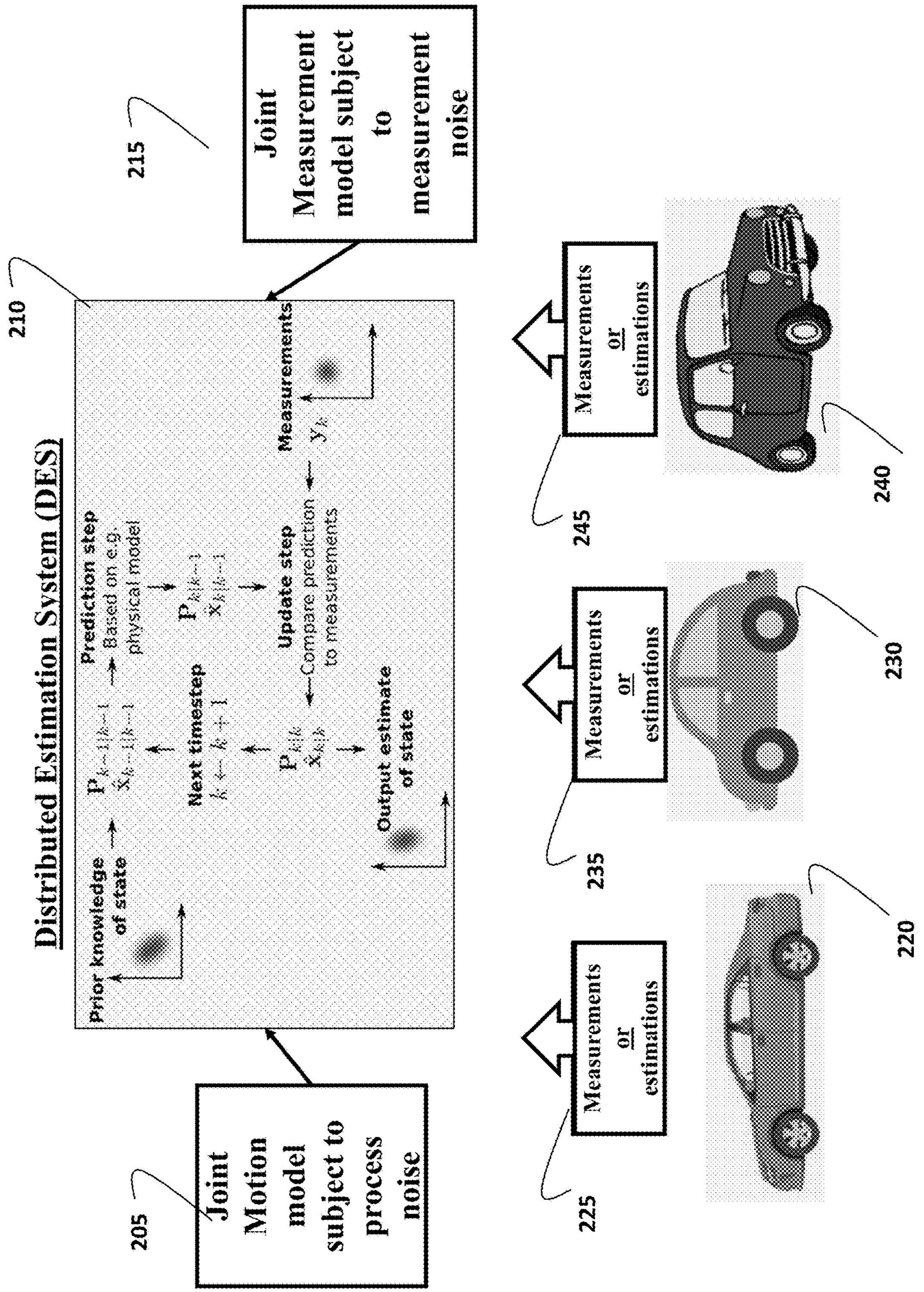
FIG. 2B shows a general schematic of a distributed estimation system (DES) utilizing two types of information.

FIG. 2B shows a general schematic of a distributed estimation system (DES) utilizing two types of information 225, 235, 245, according to some embodiments.

In some embodiments, the information 225, 235, 245 that is sent to the DES is the estimate from the local filter executing in each moving device 220, 230, 240. In other embodiments, the information 225, 235, 245 that is sent is the measurement vector for each moving device, which has been obtained using sensors either physically or operatively connected to the moving device. The best type of information to be used by the DES depends on numerous factors, including the type of environment, type of moving device, quality of measurements, quality of estimates, and how long the estimation in the DES and moving devices has been ongoing. Other embodiments determine whether to execute the DES altogether, or revert back to only using local estimates, because in certain settings the DES only makes estimation worse.

For example, when the measurement noise between two sensors is correlated, meaning there is a relation between them, but the DES does not know about this, the DES may end up in producing estimates with more uncertainty than a local estimator would provide.

For example, for particular types of sensors, when the delay in transmitting some measurements to the DES is large in relation to the time the estimator has executed, using estimates may be preferable.

Therefore, some embodiments use these factors to determine which information to be used at particular time steps. Doing in such a manner makes it possible to come up with the best possible estimation at a given time.

Other embodiments acknowledge that when switching between the type of information, different DESs have to be used because it is impractical to provide a universal DES that can handle any type of measurement without major alterations. For example, one embodiment switches between a measurement-sharing probabilistic filter and an estimate-sharing consensus-based distributed Kalman filter (DKF).

Figure 3A:
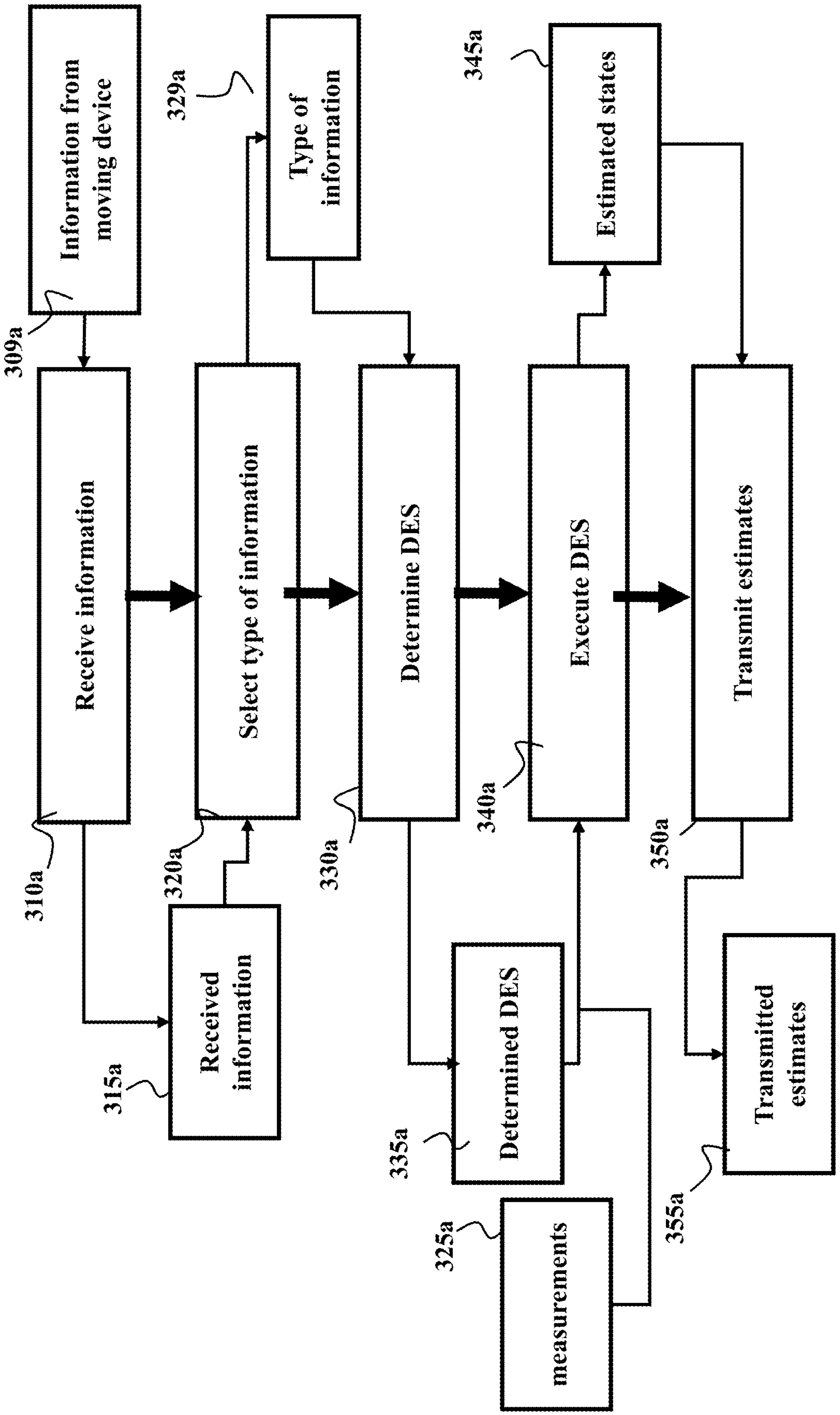
FIG. 3A shows a flowchart of a method for jointly tracking a plurality of moving devices using a hybrid distributed estimation system (HDES) according to some embodiments.

FIG. 3A shows a flowchart of a method for jointly tracking a plurality of moving devices using a hybrid distributed estimation system (HDES) according to some embodiments. In the embodiments, the information is received over a wireless communication channel from the moving devices. First, the method receives 310*a* from a wireless communication channel 309*a* information transmitted from a set of moving devices according to some embodiments. The information includes one or a combination of measurements of a state of a moving device and an estimation of the state of the moving device. Using the information 315*a*, the method selects 320*a* the type of information 329*a* to be used in the DES.

Using the determined type of information 329*a*, the method then determines 330*a* the DES to be executed using the selected type of information. For example, in one embodiment the information is selected to be the measurements relating to the moving devices, and the DES is a measurement-sharing Kalman-type filter. In another embodiment, the information is the estimated state and the corresponding DES is a consensus-based distributed Kalman filter (DKF).

Using the determined DES 335*a*, the method executes 340*a* the DES to produce the estimated states 345*a* of the moving devices. Finally, the method transmits 350*a* the estimated states 345*a* to produce transmitted estimates 355*a* to each of the moving devices.

Figure 3B:
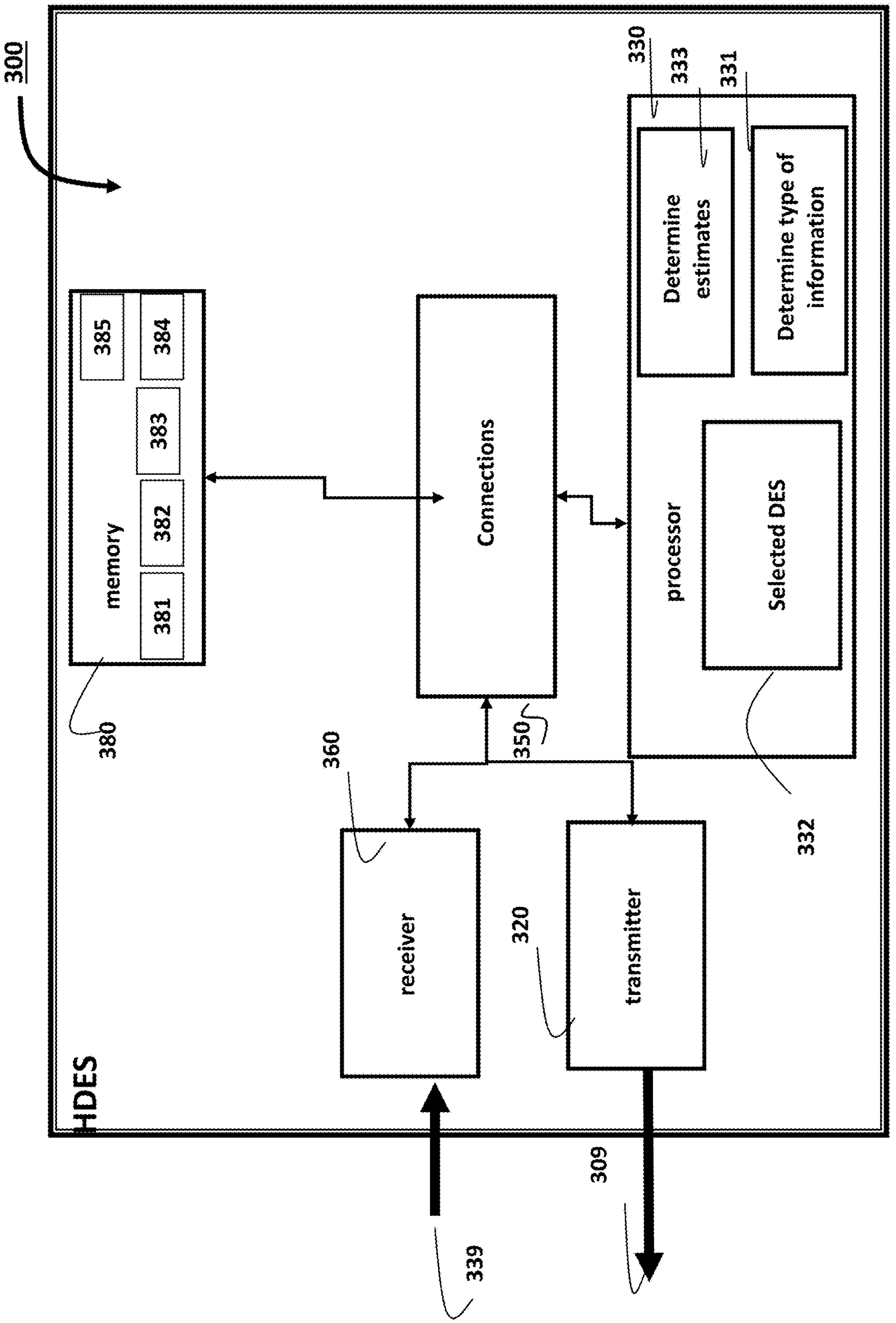
FIG. 3B shows an HDES for jointly tracking states of a plurality of moving devices.

FIG. 3B shows an HDES 300 for jointly tracking states of a plurality of moving devices, wherein each of the moving devices is configured to transmit to the DES over a wireless communication channel one or a combination of measurements of a state of a moving device and an estimation of the state of the moving device. The HDES 300 includes a receiver 360 for receiving the data 339. In one embodiment, the data include measurements of the state of the moving device. In another embodiment, the data include an estimation of a state of the moving device, e.g., an estimated mean and covariance, and in yet another embodiment, the data include a combination of measurements of the state and estimations of the state.

The HDES includes a memory 380 that stores 381 a first DES configured upon activation to jointly track the states of the moving devices based on measurements of the states of the moving devices. The memory 380 also stores 382 a second DES configured upon activation to jointly track the moving devices based on estimations of the states of the moving devices. For instance, in one embodiment the first DES is a measurement-sharing Kalman filter and the second DES is a consensus-based DKF. For instance, in one embodiment the first DES is a measurement-sharing Kalman filter and the second DES is a weighted DKF. In some embodiments, the first DES includes a model of the cross-correlation of the measurement noise of the measurements from the moving devices. In other embodiments, the cross-correlation is unknown and is estimated in the HDES based on the transmitted 339 noise and location of the sensors measuring the moving devices.

The memory 380 can also include 383 a probabilistic motion model relating a previous belief on the state of the vehicle with a prediction of the state of the moving devices according to the motion model and a probabilistic measurement model relating a belief on the state of the vehicle with a measurement of the state of each moving device. The memory also stores instructions 384 on how to determine which DES to execute. The memory additionally or alternative can store 385 the communication bandwidth needed for the first DES and the second DES as a function of the state dimension and measurement dimension.

The receiver 360 is configured to receive over the communication channel multi-type information from the plurality of moving devices, wherein types of the information include one or a combination of a first type for the measurements of the states of the moving devices and a second type for the estimation of the states of the moving devices.

The receiver 360 is operatively connected 350 to a processor 330 configured to select 331 the first type or the second type of the information. Based on the determined 331 type of information, the processor is furthermore configured to switch between activation and deactivation of the first DES and the second DES based on the selected type of information, and to execute the activated DES 332 to produce 333 estimates of the states of the moving devices.

The HDES 300 includes a transmitter 320 operatively connected 350 to the processor 330. The transmitter 320 is configured to submit 309 to the moving devices over the communication channel the selected 331 type of information and the jointly tracked states 333 of the moving devices estimated by the activated DES 332.

In some embodiments, the submitted tracked states include a first moment of the state of a moving device. In other embodiments, the information includes a first moment and a second moment of a moving device. In other embodiments, the information includes higher-order moments to form a general probability distribution of the state of a moving device. In other embodiments, the information includes data indicative of an estimation of the state of a moving device and the estimation noise, e.g., as samples, first and second moment, alternatively including higher-order moments. In yet other embodiments, the time of receiving the information is different from the time the information was determined. For example, in some embodiments, an active remote server includes instructions to determine first and second moments, and the execution of such instructions, possibly coupled with a communication time between the remote server and the RF receiver. To this end, in some embodiments, information 309 includes a time stamp of the time the first and second moments were determined.

In some embodiments the first type of information includes a measurement and a measurement statistic of the expected distribution of the measurement, e.g., a noise covariance in the case of Gaussian assumed noise. In other embodiments the first type of information additionally includes information necessary to construct a measurement model, e.g., the location of the sensor measuring the moving device, the time of measurement. In some embodiments the second type of information include a mean estimate of the state and, additionally, the associated covariance. In other embodiments the second type additionally includes one or a combination of time of the estimation, higher order moments or samples of estimations of the states, e.g., as an output from a particle filter.

Some embodiments are based on the understanding that the determining to use the first type of information or the second type of information is not a one-time decision, and a first type of information that is the preferred choice at a particular time step may be the least preferred choice at a future time step, or vice versa.

For instance, if the cross-correlation between measurements across the moving devices is known to the HDES, it is fundamentally, from an information-theoretic viewpoint, better to use the first type of information than the second type of information, because the first type of information contains information of correlation between the moving devices that the second type of information cannot include.

For instance, if the cross-correlation between measurements across the moving devices is unknown to the HDES, it provides no extra information to use the first type of information over the second type of information. In addition, if using the first type of information without having the cross-correlation, such estimation may lead to wrong conclusions of the joint state estimates. Hence, it may be preferable to use the second type of information.

Some embodiments are based on the understanding that information relevant to determining the type of information to use varies over time. For instance, the cross-correlation between measurements can be unknown at certain time steps but later become known, which could warrant choosing the first type of information over the second type of information.

For instance, the number of moving devices included in the joint estimation can vary over time, and as a result, the information provided by the first type of information and the second type of information will both vary over time. In addition, the quality of the types of information varies over time, differently from each other, and as such, the type of information to choose varies over time.

Figure 4A:
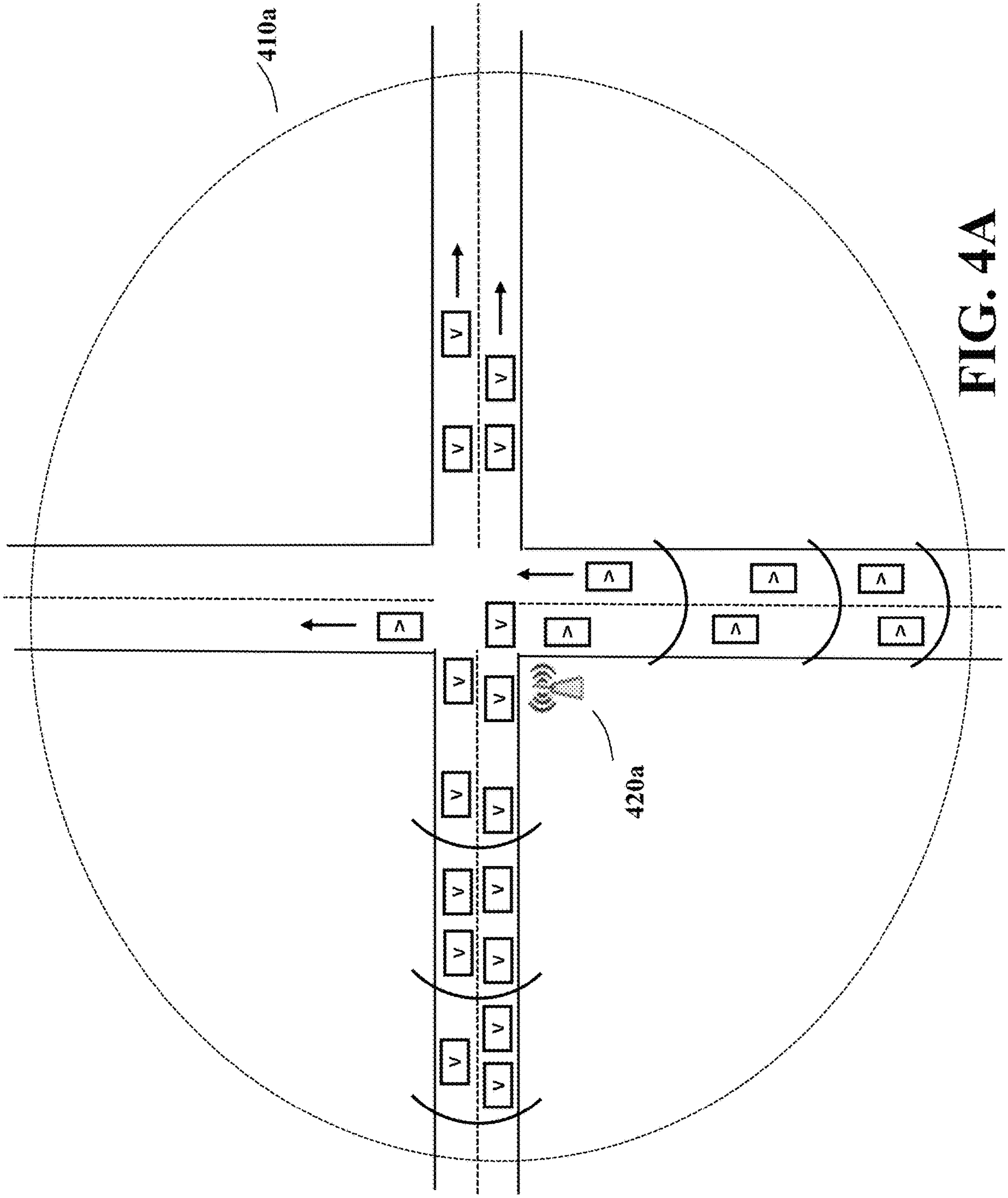
FIG. 4A shows multiple vehicles, autonomous, semi-autonomous, or manually driven, in the vicinity of each other.
Figure 4B:
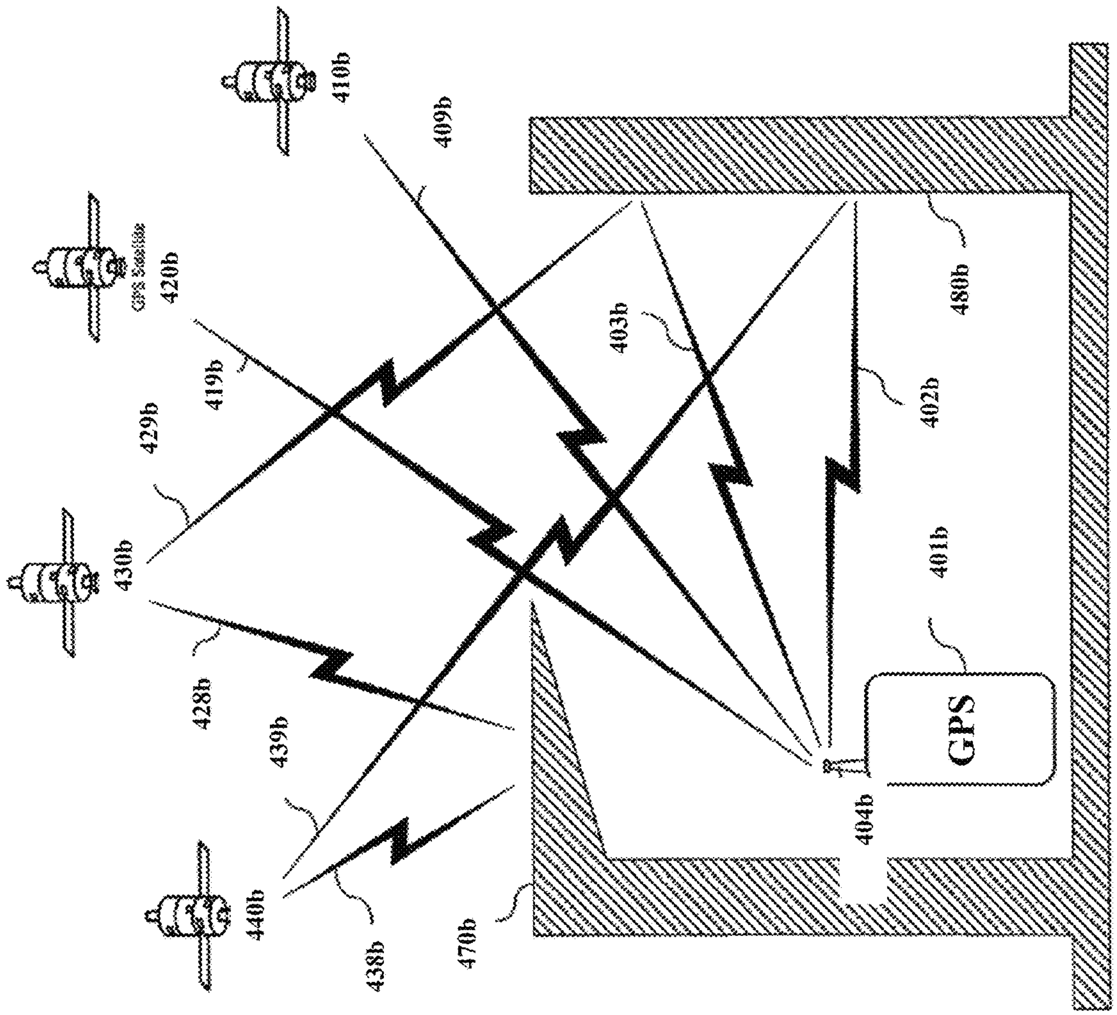
FIG. 4B illustrates an urban canyon setting.

As an exemplar application, consider the setting in FIG. 4A where there are multiple vehicles, autonomous, semi-autonomous, or manually driven, in the vicinity 410*a* of each other. The vehicles transmit 420*a* information to an HDES. As the vehicles move, some vehicles will move out of the joint area 410*a* and some other vehicles will enter area 410*a*, but the number of vehicles will not stay constant. The vehicles locally use a global navigation satellite system (GNSS) for tracking their state and its first type of information includes GNSS measurements. Considering FIG. 4B, illustrating that in certain settings, e.g., urban canyon settings, environment 470*b* limits the measurement quality of certain satellites. For example, satellites 440*b* and 430*b* do not have a direct path 438*b* and 428*b* to the receiver 404*b* but its measurements experience multipath 439*b* and 429*b*. However, satellites 420*b* and 410*b* have a direct path to transmit their measurements 419*b* and 409*b*. Since the ratio of good measurements contra bad measurements, meaning measurements with direct line of sight and no direct line of sight, varies with time, also the choice of whether to use the first type of information or the second type of information will vary with time.

To that end, some embodiments track a variation of the quality of information over time and select between the first and the second DES by comparing the measure of the quality with a threshold. Examples of the measures of the quality of information include signal-to-noise ratio (SNR), presence, types, and the extent of multipath signals, confidence of measurements, and the like.

Figure 5A:
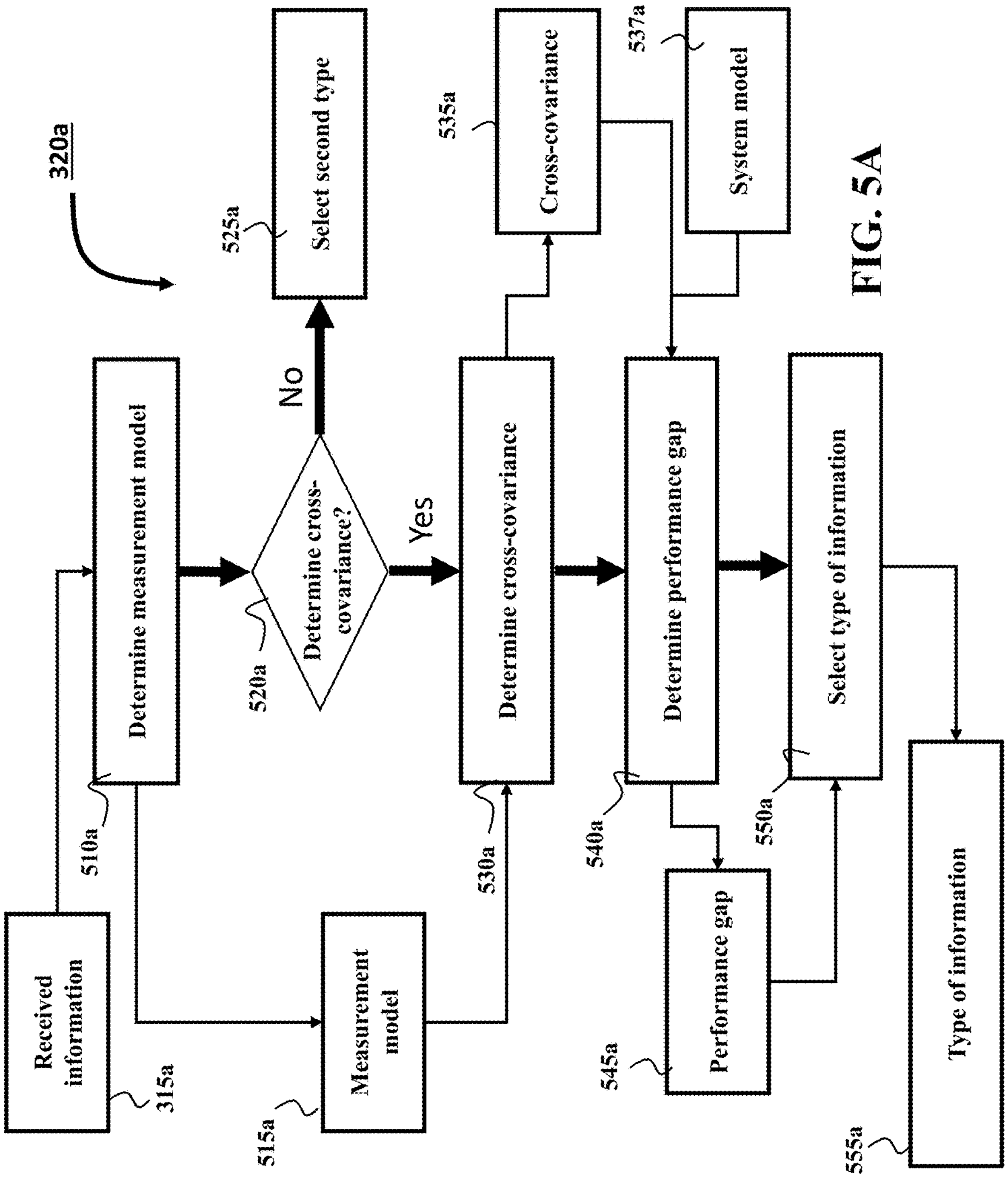
FIG. 5A shows a flowchart of a method for determining the type of information to be used in the HDES.

FIG. 5A shows a flowchart of method 320*a* for determining the type 329*a* of information to be used in the HDES. Using the received information 315*a*, the method determines 510*a* a measurement model 515*a* describing the relation between a state of a moving device and a measurement of a state of a moving device. Next, the method determines 520*a* whether the received information 315*a* is enough to determine the cross-covariance between the measurements across the moving devices. If it is not possible to determine the cross-covariance, the method selects 525*a* the second type of information. If it is possible to determine the cross-covariance, the method determines 530*a* the cross-covariance 535*a*. Based on the cross-covariance 535*a* and the measurement model 515*a*, the method next determines 540*a* the performance gap between the estimation using the first DES and the estimation using the second DES, wherein the performance gap is determined based on a predicted output of the different DES according to the system model 537*a*.

The determining 510*a* measurement model is based on a mathematical probabilistic representation of the relation between the state of the moving devices and the measurement. For instance, in one embodiment the measurement model is approximately linear according to $$\begin{bmatrix} y_k^1 \\ \vdots \\ y_k^N \end{bmatrix} \sim \mathcal{N}\left(\begin{bmatrix} C_1 \\ \vdots \\ C_N \end{bmatrix} x, \begin{bmatrix} R_{11} & \dots & R_{1N} \\ \vdots & \ddots & \vdots \\ R_{N1} & \dots & R_{NN} \end{bmatrix}\right) \triangleq \mathcal{N}(Cx, R)$$

wherein $\mathcal{N}$ is the Gaussian distribution, $$\begin{bmatrix} y_k^1 \\ \vdots \\ y_k^N \end{bmatrix}$$

is the matrix of vector measurements of the N moving devices, $$\begin{bmatrix} C_1 \\ \vdots \\ C_N \end{bmatrix}$$

is the corresponding measurement matrix, and $$\begin{bmatrix} R_{11} & \dots & R_{1N} \\ \vdots & \ddots & \vdots \\ R_{N1} & \dots & R_{NN} \end{bmatrix}$$

is the covariance matrix, wherein the off-diagonal blocks correspond to the cross-covariance and is either transmitted with the type of information or determined by the HDES according to other embodiments. In other embodiments, the measurement model is nonlinear according to y=h(x)+e, where h is the nonlinear relation. Some embodiments linearize h to get C, whereas other embodiments represent the model in its original nonlinear formulation. In some embodiments, the received information 315*a* includes information necessary to determine the measurement model, in other embodiments the information is already stored in the memory 385.

To determine whether the cross-covariance can be computed, the method checks the received information 315*a* for its content. For instance, in some embodiments, the positions of the sensors, together with nominal noise values, are needed to determine the cross-covariance. In other embodiments, the sensor locations are fixed and the cross-covariance can then be determined a priori and stored in the memory 380. In other embodiments, the sensors are attached to the moving devices and therefore the cross-covariance can be computed from the estimations of the state of the moving device.

Some embodiments determine the type of information based on one or a combination of a bandwidth of the communication channel and several of the moving devices, a correlation among the measurements collected by the moving devices, an expected difference between joint state estimations of the first DES and the second DES, and the communication delay in transmitting the first and second type of information to the HDES.

Figure 5B:
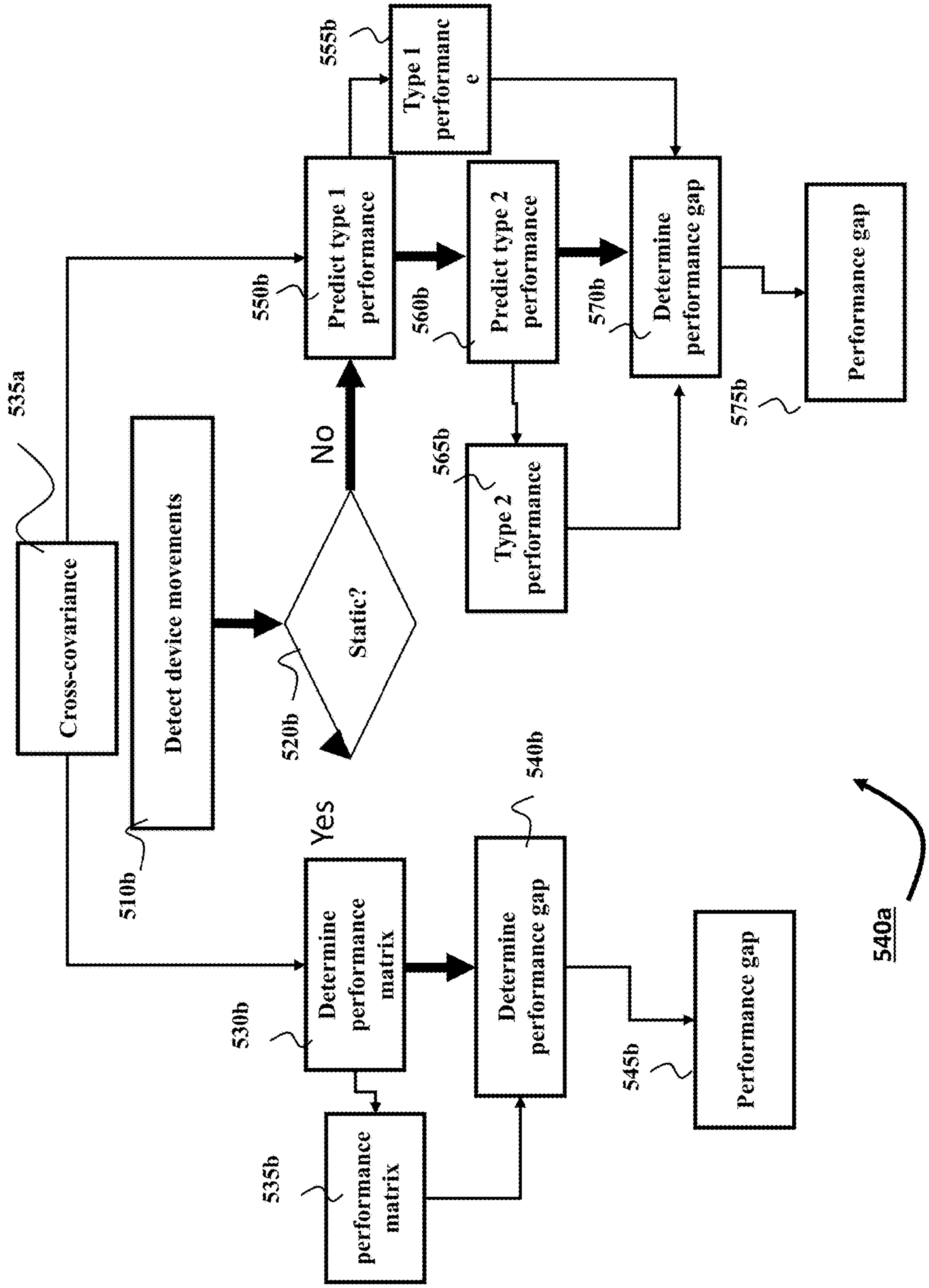
FIG. 5B shows a flowchart of a method for determining the performance gap according to some embodiments.

To determine 540*a* the performance gap 545*a*, different embodiments proceed in several ways. FIG. 5B shows a flowchart of method 540*a* for determining the performance gap according to some embodiments. First, the method determines 510*b* whether the moving devices are to be considered currently static devices or currently moving devices. This can be advantageous because determining the performance gap is made substantially easier if the devices are at standstill, or nearly still. One embodiment determines the movement by comparing the measurement or estimate from a previous time step with a current estimate or measurement and considers the devices to be currently moving if at least one of the devices has moved more than a threshold.

If the devices are static 520*b*, the method proceeds with determining 530*b* a performance matrix 535*b*. In some embodiments, the performance matrix is determined as a combination of the measurement model, the joint measurement covariance without the cross-covariance inserted into the joint measurement covariance, and the joint measurement covariance with the cross-covariance inserted into the joint measurement covariance.

For instance, one embodiment determines the performance gap between a DES with a first type of information and a DES with a second type of information by determining the expected uncertainty, e.g., the covariance, of the DES estimates. For example, one embodiment determines the performance gap according to $$J_{gap} = \frac{1}{T} M \succeq 0,$$

where $M \triangleq +(C^T \bar{R}^{-1} C)^{-1} C^T \bar{R}^{-1} R \bar{R}^{-1} C (C^T \bar{R}^{-1} C)^{-1} - (C^T R^{-1} C)^{-1}$, T is the time step, and where $\bar{R}$ is the covariance without the cross-covariances inserted into the joint measurement covariance. In other words, the performance gap is a combination of a correlation among the measurements collected by the moving devices, and an expected difference between joint state estimations of the first DES and the second DES. When the measurement model is nonlinear, in accordance with other embodiments, a linearized approach can be taken, or a sampling-based approach can be taken.

The performance gap $J_{gap}$ is in general a matrix indicating the general performance gap between a DES using a first type of information with a DES using a second type of information. Some embodiments evaluate the performance gap by determining the trace of $J_{gap}$, which gives a way to evaluate the performance gap matrix. Other embodiments evaluate $J_{gap}$ by determining the norm of $J_{gap}$, which is a second way to evaluate the performance gap matrix.

If the devices are not static 520*b*, the method instead proceeds, using the cross-covariance 535*a* inserted into the joint measurement covariance, with predicting 550*b* the state performance 555*b* of the first DES. Next, the method predicts 560*b* the state performance 565*b* of the state using the second DES. Using the determined performances, the performances are compared and subsequently the performance gap 575*b* is determined 570*b*.

In some embodiments, the performance is defined as the predicted second moment of the DES, i.e., the covariance of the estimated state of the DES. For instance, in one embodiment the Kalman filter recursions are used to recursively predict the covariance of the state estimate with 550*b* and without 570*b* the cross-covariance inserted into the joint measurement covariance according to $$P^1_{k|k} = \left(C^T R^{-1} C + \left(P^1_{k|k-1}\right)^{-1}\right)^{-1}$$

for the first DES and $$P^2_{k|k} = \left(\left(C^T \bar{R}^{-1} C\right)\left(C^T \bar{R}^{-1} R \bar{R}^{-1} C\right)^{-1}\left(C^T \bar{R}^{-1} C\right) + \left(P^2_{k|k-1}\right)^{-1}\right)^{-1}$$

for the second DES. In other embodiments, the recursions are determined using LRKFs, and in other embodiments the performance includes a predicted mean of the estimations.

Using the determined performances for the respective DES, the method determines 579*b* the performance gap 575*b*. For instance, one embodiment determines the performance gap by comparing the mean-square errors assuming an unbiased estimator, which is directly related to the covariance of such unbiased estimator.

Figure 5C:
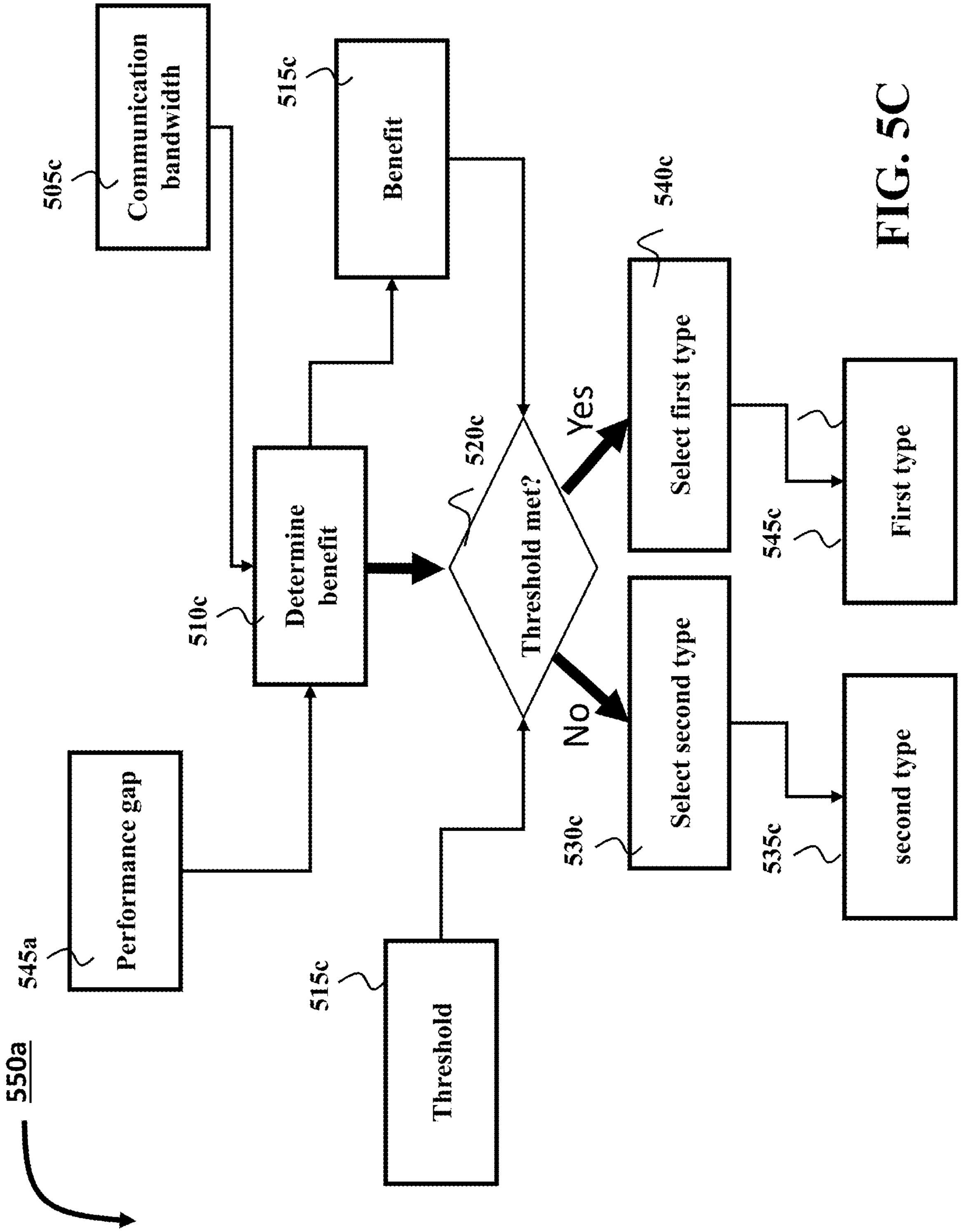
FIG. 5C shows a flowchart of a method for selecting the type of information using the performance gap according to some embodiments.

FIG. 5C shows a flowchart of a method for selecting 550*a* the type of information using the performance gap 545*a* according to some embodiments. The method relies on a threshold, either stored in memory 380 or determined during runtime. Using the performance gap 545*a* and a communication bandwidth 505*c* of the first DES and second DES, the method determines 510*c* a benefit 515*c* of using the second type of information in the first DES compared to using the second type of information in the second DES. Next, the method determines 520*c* if a threshold 515*c* of benefit is met. If yes, the method selects 540*c* the first type of information 545*c*. Otherwise, the method selects 530*c* the second type of information 535*c*.

In some embodiments, the benefit 515*c* is a weighted combination of the performance gap 545*a* and communication bandwidth 505*c*. For instance, in settings where the communication resources are very high, the communication bandwidth 505*c* is getting a relatively small weight. In settings where the communication resources are low, the communication bandwidth 505*c* is getting a relatively large weight.

Other embodiments select the first type of information according to the criteria $T[M]_{ij}>K([M]_{ij}+[N]_{ij})$, where $[M]_{ij}$ is the ijth element, $N=(C^T R^{-1} C)^{-1}$, T the time step, and K the measurement delay, i.e., as a combination of the measurement model, measurement covariance, cross-covariance, the time the HDES has executed since initializing.

Some embodiments are based on the understanding that sometimes certain elements ij are of most importance, e.g., sometimes a particular state of a few particular moving devices is of interest, which gives a way to determine specific elements ij.

Other embodiments are based on the understanding that there sometimes may be multiple element combinations ij. In such a case, one embodiment evaluates $T[M]_{ij}>K([M]_{ij}+[N]_{ij})$ for different element combinations and use a weighting between the element combinations to determine the selection of the type of information.

Referring to FIG. 3A, when the type of information has been selected, the corresponding DES 335*a* is determined 330*a*, and the DES is subsequently executed. Some embodiments are based on the understanding that when a particular DES has been selected for execution, it needs to be initialized. Other embodiments acknowledge that such initialization better be done in accordance with the estimates of the other DES, because otherwise, there will be switching in between the estimator.

Figure 6:
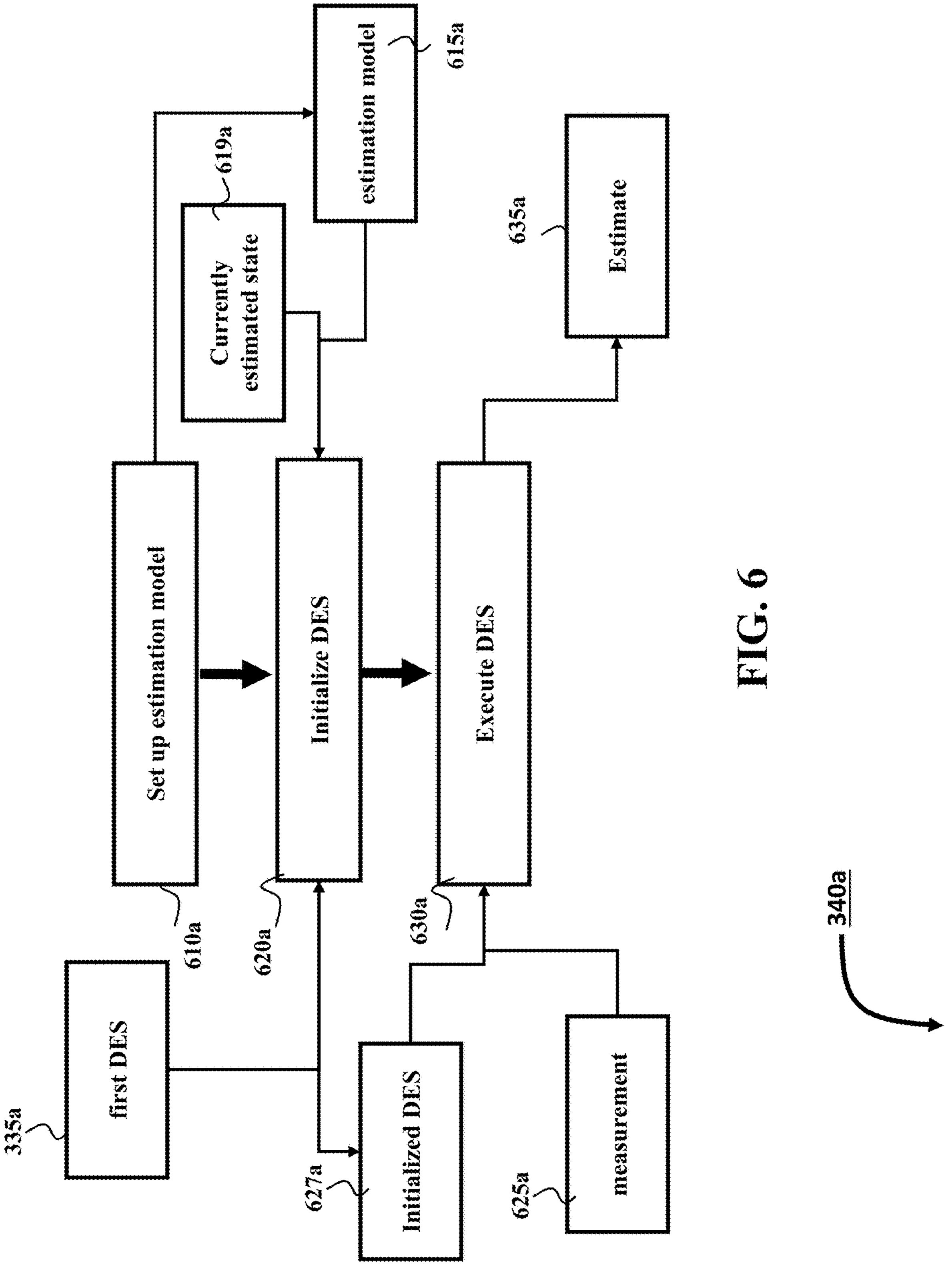
FIG. 6 shows a flowchart of a method for executing a selected first DES according to some embodiments.

FIG. 6 shows a flowchart of a method for executing a selected first DES 340*a* according to some embodiments. First, the method sets up 610*a* the estimation model 615*a*, which includes; setting the dimension of the state according to the number of moving devices and the state to be estimated in each device; extracting from memory a probabilistic motion model and expanding it to the dimension of the state; extracting from memory a probabilistic measurement model and expand it to the dimension of the measurement from the moving devices, resulting in a probabilistic estimation model 615*a*. Next, the method, using the current estimated state 619*a* in the HDES, initializes 620*a* the DES to produce an initialized DES 627*a*. Finally, using the initialized DES and the measurements 625*a*, the method executes 630*a* the first DES and produces an estimate of the state 635*a*.

The initialization 620*a* is done by setting the initial estimate of the first DES to the estimate of the second DES. For example, if the estimator is an estimator estimating the first two moments of the state, the most recent mean, and covariance 619*a* are used to initialize 620*a* the first DES. For example, if the HDES is estimated using a particle filter in both DES, the particles are set to align with each other.

Figure 7:
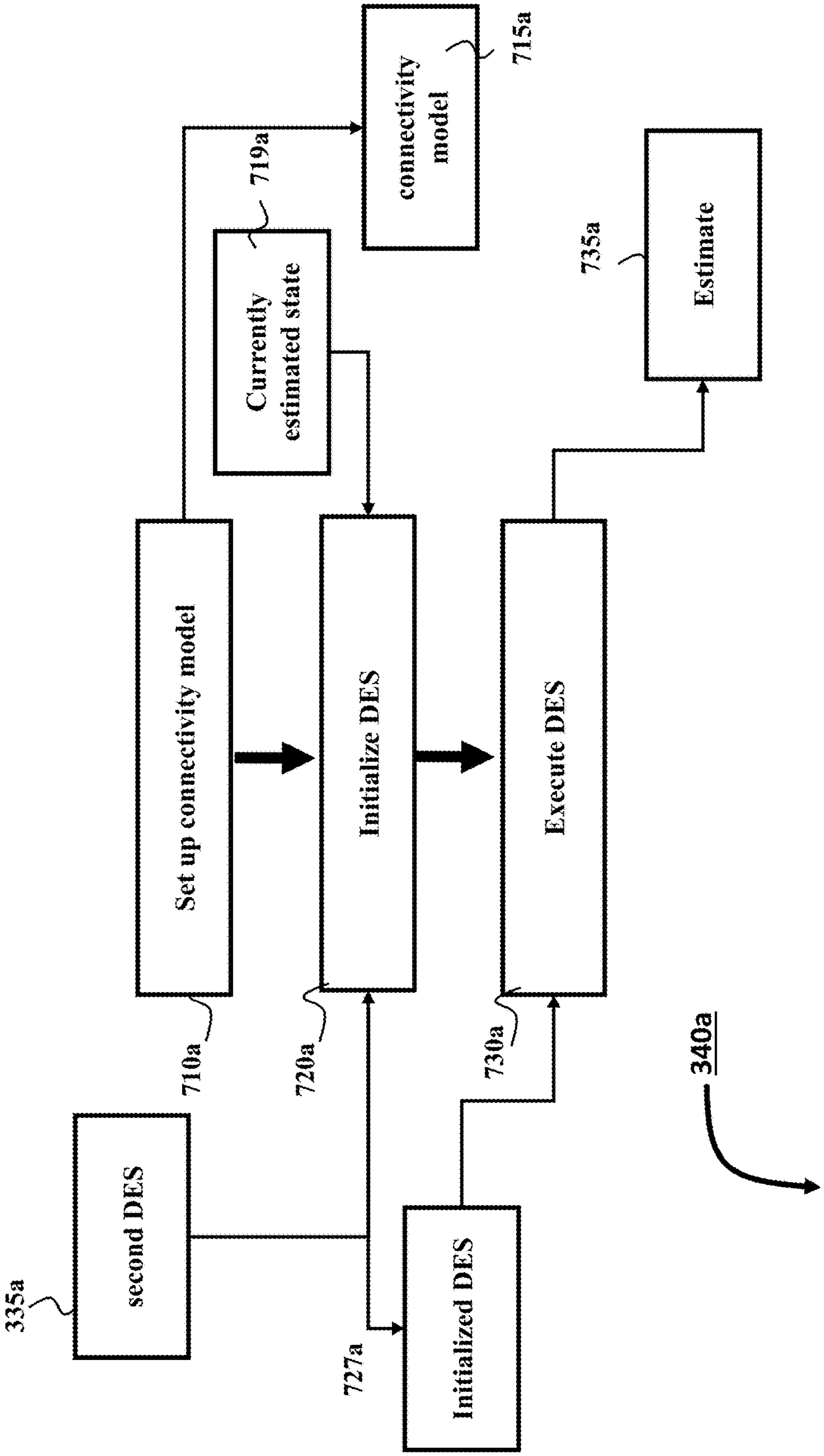
FIG. 7 shows a flowchart of a method for executing a selected second DES according to some embodiments.

FIG. 7 shows a flowchart of a method for executing a selected second DES 340*a* according to some embodiments. First, the method sets up 710*a* the connectivity model 715*a*, which includes; setting the dimension of the state according to the number of moving devices and the state to be estimated in each device; extracting the communication topology from memory, and the weights to be used in the fusing the estimates. Next, the method, using the current estimated state 719*a* in the HDES, initializes 720*a* the DES to produce an initialized DES 727*a*. Finally, using the initialized DES, the method executes 730*a* the second DES and produces an estimate of the state 735*a*.

In some embodiments the first DES and second DES use different types of estimators, e.g., the first DES estimates the first two moments and the second DES is a sampling-based estimator or vice versa. In such a case, the samples are used to determine the first two moments. Similarly, the samples can in its turn be sampled from the first two moments to initialize a sampling-based estimator.

Some embodiments implement the first DES as a KF. Other embodiments use an LRKF that works in the spirit of a KF. Yet other embodiments implement the first DES as a particle filter (PF).

Some embodiments apply a PF as a measurement sharing PF, wherein the measurement model include all measurements according to $y_k=h(x_k)+e_k$, wherein $$y_k = \{y^1, y_k^2, \ldots , y_k^N\} \text{ and } h(x_k) = \{h^1(x_k), h^2(x_k), \ldots , h^N(x_k)\},$$

and wherein $$\begin{bmatrix} R_{11} & \ldots & R_{1N} \\ \vdots & \ddots & \vdots \\ R_{N1} & \ldots & R_{NN} \end{bmatrix}$$

is the covariance matrix of the zero-mean Gaussian distributed measurement noise $e_k$, wherein the off-diagonal blocks correspond to the cross-covariance and is either transmitted with the type of information or determined by the HDES according to other embodiments. In other words, the PF uses the nonlinear measurement relation $h(x_k)$ directly as opposed to a KF that employs a linearization.

Using the measurement model, the PF approximates the posterior density as $$p(x_{0:k}|y_{0:k}) \approx \sum_{i=1}^{N} q_k^i \delta_{x_{0:k}^i}(x_{0:k}),$$

where $$q_k^i$$

is the importance weight of the ith state trajectory $$x_{0:k}^i$$

and $\delta(\cdot)$ is the Dirac delta mass. The PF recursively estimates the posterior density by repeated application of Bayes' rule according to $p(x_{0:k}|y_{0:k}) \propto p(y_k|x_{0:k}, y_{0:k-1})p(x_k|x_{0:k-1}, y_{0:k-1}) \cdot p(x_{0:k-1}|y_{0:k-1})$. To predict the state samples, the key design step is the proposal distribution $\pi(\cdot)$, which results in predicted state samples according to $x_k \sim \pi(x_k|x_{0:k-1}, y_{0:k})$. In some embodiments, the proposal distribution is defined to predict state samples according to $$x_k^i = f(x_{k-1}^i) + w_{k-1}^i, \text{ where } w_{k-1}^i$$

is sampled according to a predefined noise model $$w_{k-1}^i \sim \mathcal{N}(0, Q).$$

Some embodiments realize that implementing such proposal distribution is uninformative. Instead, some embodiments use the conditional distribution as proposal distribution, $$\pi(x_k|x_{k-1}^i, y_{0:k}) = p(x_k|x_{k-1}^i, y_{0:k}).$$

For instance, some embodiments approximate the measurement relation as linear and Gaussian for each particle, $$\begin{aligned} p(x_k|x_{k-1}^i, y_{0:k}) &= N\left(x_k; \hat{x}_k^i, \textstyle\sum_k^i\right) \\ \hat{x}_k^i &= x_{k-1}^i + K_k^i(y_k - \hat{y}_{k|k-1}^i), \\ K_k^i &= Q(Q + S_k^i)^{-1}, \\ \textstyle\sum_k^i &= ((S_k^i)^{-1} + (Q)^{-1})^{-1}, \end{aligned}$$

but other approximations of the measurement relation can be used, resulting in other proposal distributions.

Yet other embodiments recognize that the motion model and measurement model is not linear in all states. For example, for a moving device, a possible state includes a position, heading, and velocity of the moving device. However, for a GNSS measurement the position is nonlinear in the measurement relation but the heading and velocity are not. Hence various embodiments employ marginalized PFs, which execute a PF for the nonlinear part of the state vector, and conditioned on the state trajectory, KFs are executed, one for each particle.

Various embodiments employ different motion models such that many states can be nonlinear. However, some embodiments recognize that some nonlinearities are severe, whereas other nonlinearities are mild. Consequently, one embodiment implements the PF as a marginalized particle filter where the severely nonlinear states are used in the PF and linear and mildly nonlinear states are approximated with an extended KF or LRKF.

Figure 8A:
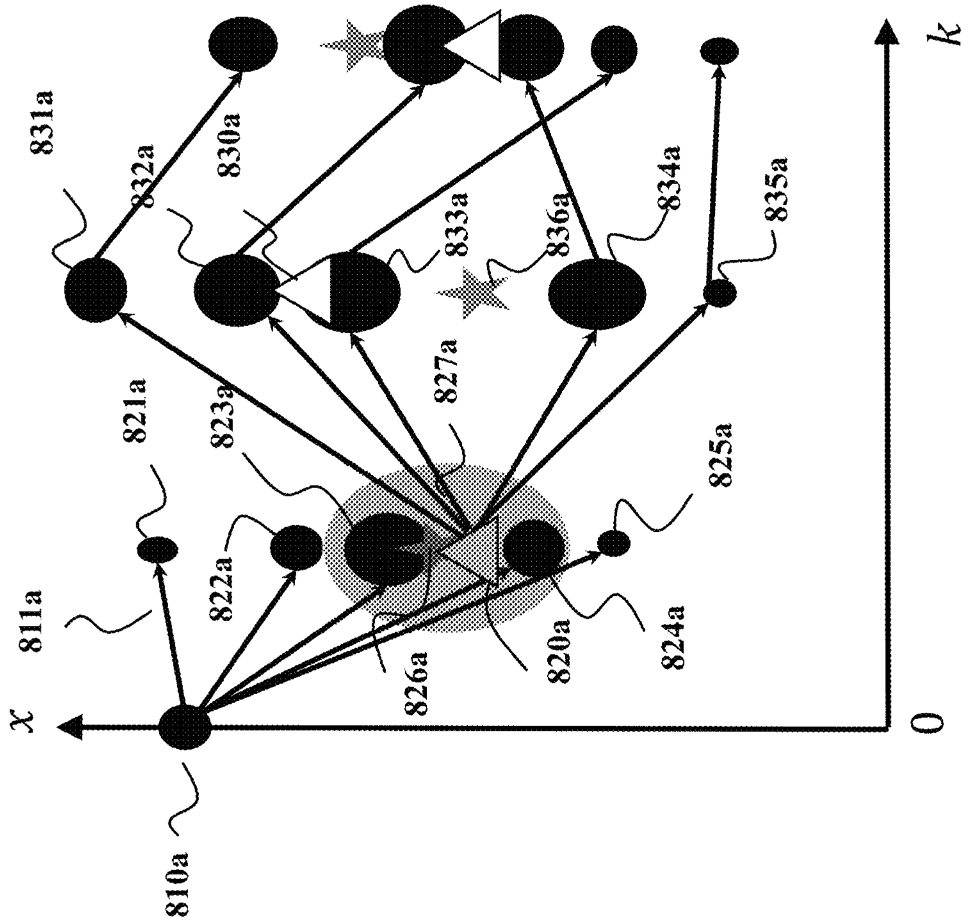
FIG. 8A shows a simplified schematic of the result of three iterations of a particle filter according to some embodiments.

FIG. 8A shows a simplified schematic of the result of three iterations of a particle filter according to some embodiments. The initial state 810_a_, which can be one of many samples or spread out in the state space, is predicted forward in time 811_a_ using the model of the motion, and five next states are 821_a_, 822_a_, 823_a_, 824_a_, and 825_a_. The probabilities are determined as a function of the probabilistic measurement 826_a_ and the measurement noise 827_a_. At each time step, i.e., at each iteration, an aggregate of the probabilities is used to produce an aggregated state estimate 820_a_.

Figure 8B:
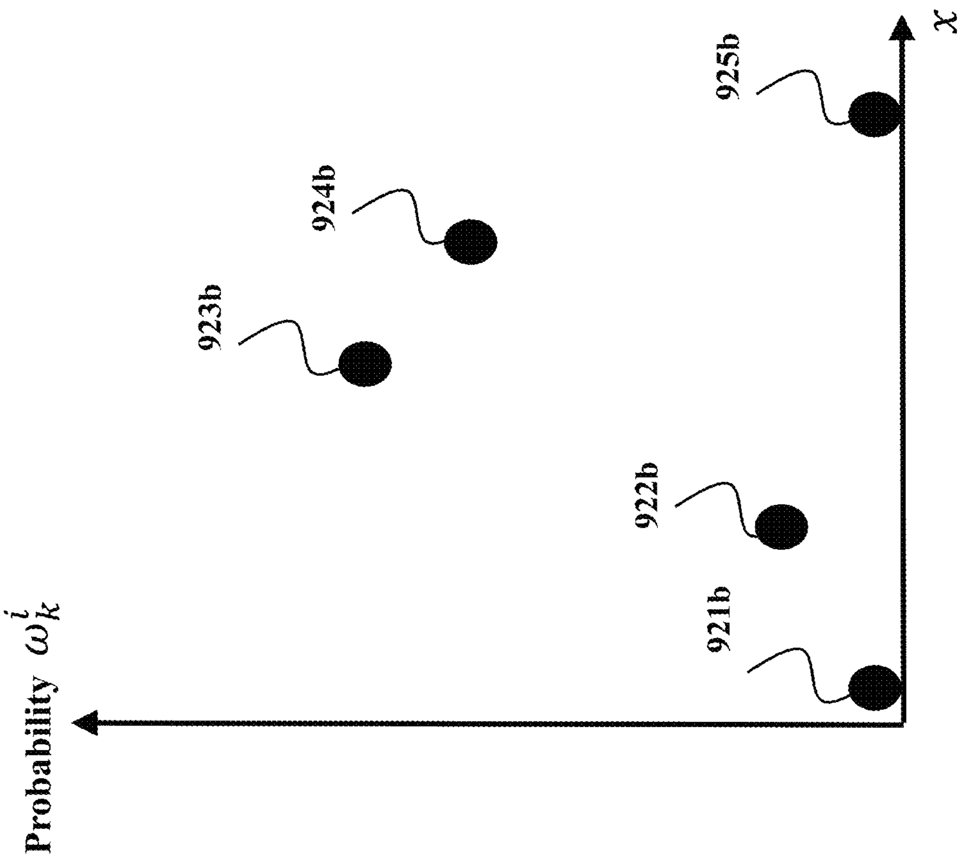
FIG. 8B shows possible assigned probabilities of the five states at the first iteration in FIG. 8A.

FIG. 8B shows possible assigned probabilities of the five states at the first iteration in FIG. 8A. Those probabilities 821_b_, 822_b_, 823_b_, 824_b_, and 825_b_ are reflected in selecting the sizes of the dots illustrating the states 821_a_, 822_a_, 823_a_, 824_a_, and 825_a_.

Determining the sequence of probability distributions amounts to determining the distribution of probabilities such as those in FIG. 8B for each time step in the sequence. For instance, the distribution can be expressed as the discrete distribution as in FIG. 8B, or the discrete states associated with probabilities can be made continuous using e.g. a kernel density smoother.

Some embodiments implement the second DES as a consensus DKF (CDKF), wherein the estimates are combined by one of several consensus protocols defined by a set of weights $$\left\{w_{ij} \in \mathbb{R} | i = 1, \ldots, N,\ j = 1, \ldots, N,\ \sum_i w_{ij} = 1\right\}.$$

For example, some embodiments use one of the three protocols $$\begin{aligned} &P1:\ w_{ij} \triangleq N^{-1}, && \forall\, i \neq j, \\ &P2:\ w_{ij} \triangleq \left(\max_{j \in \mathcal{U}_i^1} |\mathcal{U}_j^1|\right)^{-1}, && \forall\, i \neq j, \\ &P3:\ w_{ij} \triangleq (1 + \max(|\mathcal{U}_i^1|, |\mathcal{U}_j^1|))^{-1}, && \forall\, i \neq j. \end{aligned}$$

One embodiment implements the consensus DKF on information form with an information vector $\gamma_{k|k}$ and information matrix $\Gamma_{k|k}$ relating to the state mean estimate as $$\hat{x}_{k|k}^i = (\Gamma_{k|k}^{ii})^{-1} \gamma_{k|k}^i$$

and covariance as $$P_{k|k}^{ii} = (\Gamma_{k|k}^{ii})^{-1}.$$

The reason for such implementation is that in information form, e.g., in the information form KF, N updates can be made by simply summing the information matrices and vectors. In one embodiment the CDKF is iterated at each time step, and the consensus protocols are implemented.

by having the nodes iterate their information vectors (and information matrices) with their neighbors over several steps according to $$\hat{\gamma}_{k|k}^{i,(n+1)} = \textstyle\sum_{j \in \mathcal{U}_i} w_{ij} \hat{\gamma}_{k|k}^{j,(n)},\ \Gamma_{k|k}^{ii,(n+1)} = \displaystyle\sum_{j \in \mathcal{U}_i^1} w_{ij} \Gamma_{k|k}^{jj,(n)},$$

for some iterations over n.

Other embodiments implement the second DES as a fused DKF (FDKF), wherein the weights are determined based on a relative uncertainty of the estimates, $$w_{ij} = \frac{\mathrm{Trace}\left[\left(\Gamma_{k|k}^{(n),i}\right)^{-1}\right]}{\sum_{j\in\mathcal{U}_i}\mathrm{Trace}\left[\left(\Gamma_{k|k}^{(n),j}\right)^{-1}\right]}.$$

Yet other embodiments employ weighted DKFs to propagate the mean estimate, by fusing a set of weight matrices $$\{W_{ij}\}_{i=1,j=1}^{i=N,j=N}$$

subject to the constraints $$W_{ij} = 0 \text{ if } j \notin \mathcal{U}_i^1, \sum_{j\in\mathcal{U}_i} W_{ij} = I.$$

In some embodiments, the weights are used to fuse the estimates similar to a CDKF, as a weighted combination of estimates, wherein the weights are optimizing the weighted posterior covariance of the estimation error.

Figure 9A:
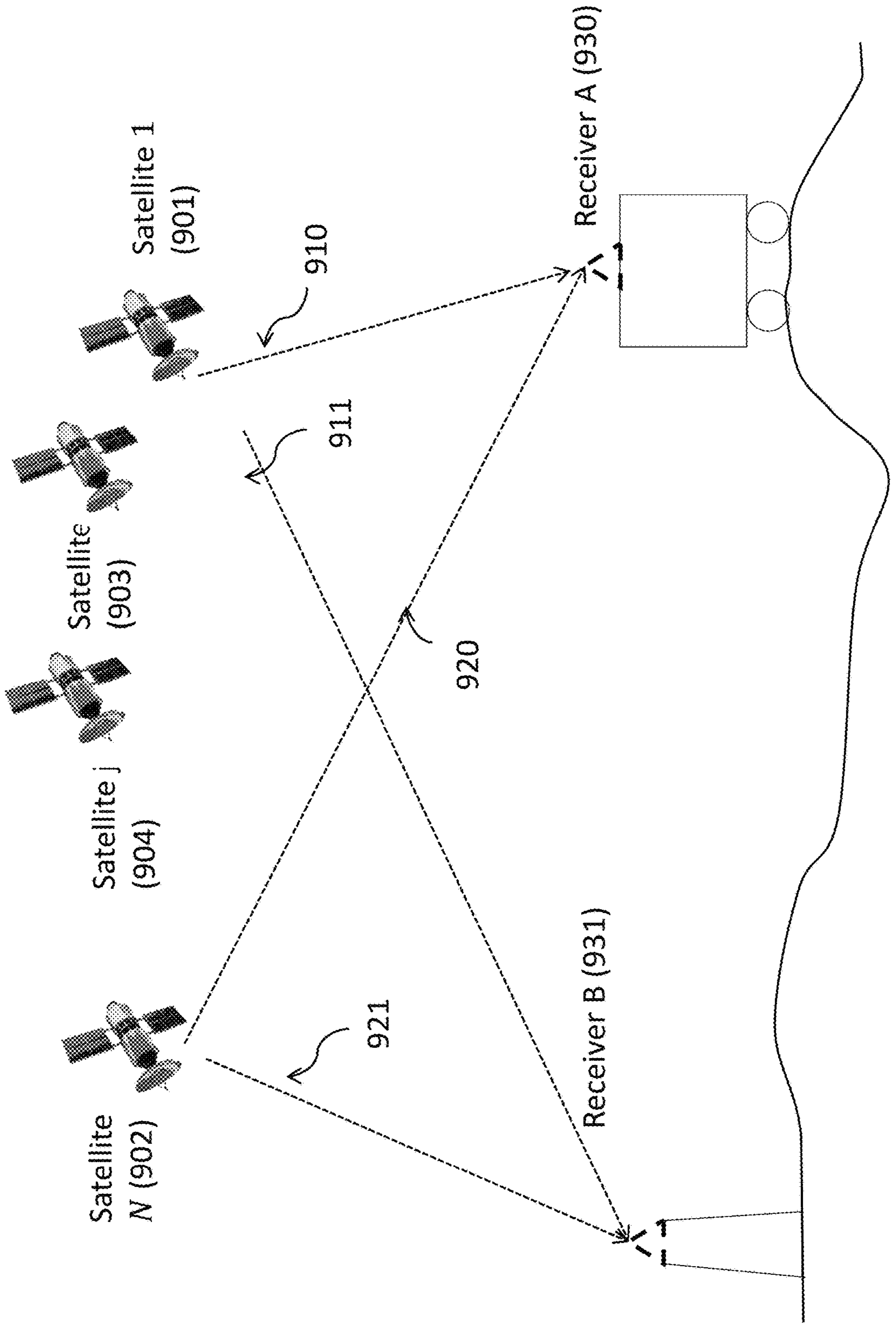
FIG. 9A shows a schematic of a global navigation satellite system (GNSS) according to some embodiments.

FIG. 9A shows a schematic of a GNSS according to some embodiments. For instance, the Nth satellite 902 transmits 920 and 921 code and carrier phase measurements to a set of receivers 930 and 931. For example, the receiver 930 is positioned to receive signals 910, 920, from N satellites 901, 903, 904, and 902. Similarly, the receiver 931 is positioned to receive signal 921 and 911 from the N satellites 901, 903, 904, and 902.

In various embodiments, the GNSS receiver 930 and 931 can be of different types. For example, in exemplar embodiment of FIG. 9A, the receiver 931 is a base receiver, whose position is known. For instance, the receiver 931 can be a receiver mounted on the ground. In contrast, the receiver 930 is a mobile receiver configured to move. For instance, the receiver 930 can be mounted in a cell phone, a car, or a tablet. In some implementations, the second receiver 931 is optional and can be used to remove, or at least decrease, uncertainties and errors due to various sources, such as atmospheric effects and errors in the internal clocks of the receivers and satellites. In some embodiments, there are multiple GNSS receivers receiving code and carrier phase signals.

In some embodiments, there are multiple mobile GNSS receivers that are jointly tracked by an HDES. The first type of information is the measurement information of code and carrier-phase measurements.

In some embodiments, the model of the motion of a receiver is a general-purpose kinematic constant-acceleration model with the state vector $x_k=[p_{r,k} v_{r,k} \alpha_{r,k}]^T$, where the three components are the position, velocity, and acceleration of the receiver. In some other embodiments, the time evolution ambiguity of propagation of the satellite signals is modeled as $n_{k+1}=n_k+w_{n,k}$, $w_{n,k}\sim \mathcal{N}(0, Q_n)$, where $n_{k+1}$ is the ambiguity and $w_{n,k}$ is the Gaussian process noise with covariance $Q_n$.

In some embodiments, the ambiguity is included in the state of the vehicle. Other embodiments also include bias states capturing residual errors in the atmospheric delays, e.g., ionospheric delays. For receivers sufficiently close to each other, the ionospheric delays are the same, or very similar, for different vehicles. Some embodiments utilize this to relationships to resolve these delays and/or ambiguities.

Some embodiments capture the carrier and code signals in the measurement model $y_k=h_k+\lambda\bar{n}_k+e_k$, where $e_k$ is the measurement noise, h is a nonlinear part of the measurement equation dependent on the position of the receiver, n is the integer ambiguity, λ is a wavelength of the carrier signal, and y is a single or double difference between a combination of satellites K.

In some embodiments, the probabilistic filter uses the carrier phase single difference (SD) and/or double difference (DD) for estimating a state of the receiver indicating a position the receiver. When a carrier signal transmitted from one satellite is received by two receivers the difference between the first carrier phase and the second carrier phase is referred as the single difference (SD) in carrier phase. Alternatively, the SD can be defined as the difference between signals from two different satellites reaching a receiver. For example, the difference can come from a first and a second satellites when the first satellite is called the base satellite. For example, the difference between signal 910 from satellite 901 and signal 920 from satellite 902 is one SD signal, where satellite 901 is the base satellite. Using pairs of receivers, 931 and 930 in FIG. 9A, the difference between SDs in carrier phase obtained from the radio signals from the two satellites is called the double difference (DD) in carrier phase. When the carrier phase difference is converted into the number of wave length, for example, λ=19 cm for L1 GPS (and/or GNSS) signal, it is separated by fractional and integer parts. The fractional part can be measured by the positioning apparatus, whereas the positioning device is not able to measure the integer part directly. Thus, the integer part is referred to as integer bias or integer ambiguity.

In general, a GNSS can use multiple constellations at the same time to determine the receiver state. For example, GPS, Galileo, Glonass, and QZSS can be used concurrently. Satellite systems typically transmit information at up to three different frequency bands, and for each frequency band, each satellite transmits a code measurement and a carrier-phase measurement. These measurements can be combined as either single differenced or double differenced, wherein a single difference includes taking the difference between a reference satellite and other satellites, and wherein double differencing includes differencing also between the receiver of interest and a base receiver with known static location.

FIG. 9B shows the various variables that are used alone or in combination in the modeling of the motion and/or measurement model according to some embodiments. Some embodiments model the carrier and code signals for each frequency with the measurement model $$P_k^j = \rho_k^j + c\left(\delta t_{r,k} - \delta t_k^j\right) + I_k^j + T_k^j + \varepsilon_k^j, \tag{1}$$

$$\Phi_k^j = \rho_k^j + c\left(\delta t_{r,k} - \delta t_k^j\right) - I_k^j + T_k^j + \lambda n^j + \eta_k^j, \tag{2}$$

where $p_j$ is the code measurement $\rho^j$ is the distance between the receiver and the j th satellite, c is the speed of light, $\delta t_r$ is the receiver clock bias, $\delta t^j$ is the satellite clock bias, $I^j$ is the ionospheric delay, $T^j$ is the tropospheric delay, $\Sigma^j$ is the probabilistic code observation noise, $\Phi^j$ is the carrier-phase observation, λ is the carrier wavelength, $n^j$ is the integer ambiguity, and $\eta^j$ is the probabilistic carrier observation noise.

In one embodiment, the original measurement model is transformed by utilizing a base receiver b mounted at a known location broadcasting to the original receiver r, most of the sources of error can be removed. For instance, one embodiment forms the difference between the two receivers 930 and 931 in FIG. 9A as $$\Delta P^{j}_{br,k} = P^{j}_{b,k} - P^{j}_{r,k} \text{ and } \Delta\Phi^{j}_{br,k} = \Phi^{j}_{b,k} - \Phi^{j}_{r,k},$$

from which the error due to the satellite clock bias can be eliminated. Another embodiment forms a double difference between two satellites j and l. Doing in such a manner, clock error terms due to the receiver can be removed. Furthermore, for short distances between the two receivers (e.g., 30 km), the ionospheric errors can be ignored, at least when centimeter precision is not needed, leading to $$\nabla\Delta P^{jl}_{br,k} \approx \nabla\Delta\rho^{jl}_{br,k} + \nabla\Delta\varepsilon^{jl}_{br,k},\ \nabla\Delta\Phi^{jl}_{br,k} \approx \nabla\Delta\rho^{jl}_{br,k} + \lambda\nabla\Delta n^{jl}_{br} + \nabla\Delta\eta^{jl}_{br,k}.$$

Alternatively, one embodiment forms the difference between two satellites 901 and 902, leading to SD measurements.

Additionally or alternatively, some embodiments are based on realization that ignoring state biases such as ionospheric errors can lead to slight inaccuracies of state estimation. This is because biases are usually removed by single or double differencing of GNSS measurements. This solution works well when a desired accuracy for position estimation of a vehicle is in the order of meters, but can be a problem when the desired accuracy is in the order of centimeters. To that end, some embodiments include state biases in the state of the vehicle and determine them as part of the state tracking provided by the probabilistic filter.

Figure 10:
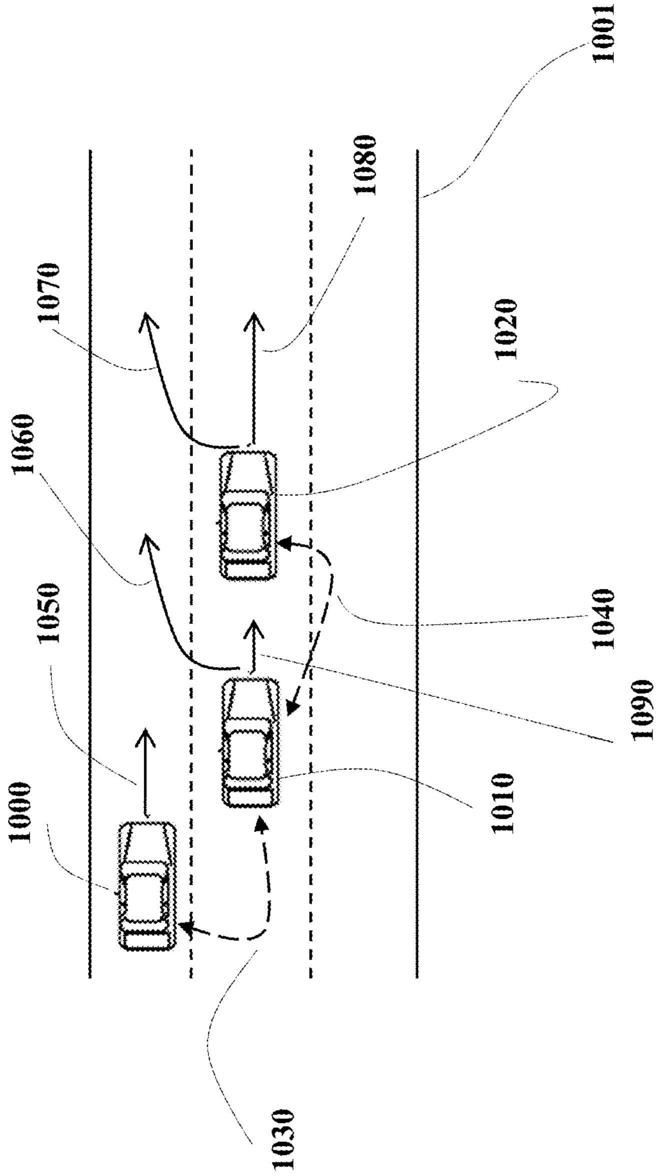
FIG. 10 shows an example of a vehicle-to-vehicle (V2V) communication and planning based on distributed state estimation according to one embodiment.

FIG. 10 shows an example of a vehicle-to-vehicle (V2V) communication and planning based on distributed state estimation according to one embodiment. As used herein, each vehicle can be any type of moving transportation system, including a passenger car, a mobile robot, or a rover. For example, the vehicle can be an autonomous or semi-autonomous vehicle.

In this example, multiple vehicles 1000, 1010, 1020, are moving on a given freeway 1001. Each vehicle can make many motions. For example, the vehicles can stay on the same path 1050, 1090, 1080, or can change paths (or lanes) 1060, 1070. Each vehicle has its own sensing capabilities, e.g., Lidars, cameras, etc. Each vehicle has the possibility to transmit and receive 1030, 1040 information with its neighboring vehicles and/or can exchange information indirectly through other vehicles via a remote server. For example, the vehicles 1000 and 1080 can exchange information through a vehicle 1010. With this type of communication network, the information can be transmitted over a large portion of the freeway or highway 1001.

Some embodiments are configured to address the following scenario. For example, the vehicle 1020 wants to change its path and chooses option 1070 in its path planning. However, at the same time vehicle 1010 also chooses to change its lane and wants to follow option 1060. In this case, the two vehicles might collide, or at best vehicle 1010 will have to execute and emergency brake to avoid colliding with vehicle 1020. This is where the present invention can help. To that end, some embodiments enable the vehicles to transmit not only what the vehicles sense at the present time instant t, but also, additionally or alternatively, transmit what the vehicles are planning to do at time T+$\delta_t$.

In the example of FIG. 10, the vehicle 1020 informs of its plan to change lane to vehicle 1010 after planning and committing to execute its plan. Thus, the vehicle 1010 knows that in $\delta_t$ time interval the vehicle 1020 is planning to make a move to its left 1070. Accordingly, the vehicles 1010 can select the motion 1090 instead of 1060, i.e., staying on the same lane.

Additionally or alternatively, the motion of the vehicles can be jointly controlled by the remote server based on state estimations determined in a distributed manner. For example, in some embodiments, the multiple vehicles determined for joint state estimation are the vehicles that form and potentially can form a platoon of vehicles jointly controlled with shared control objective.

Figure 11:
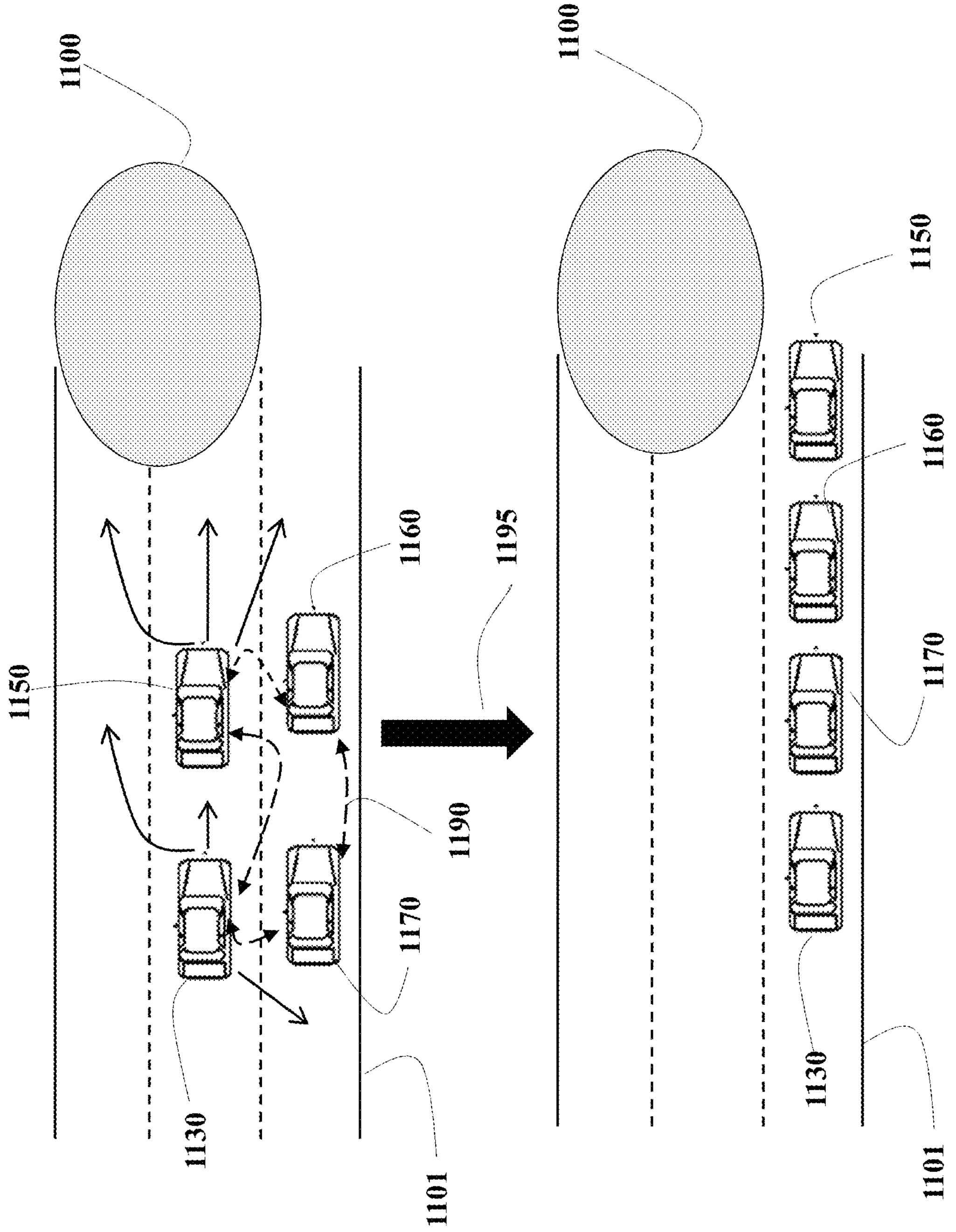
FIG. 11 is a schematic of a multi-vehicle platoon shaping for accident avoidance scenario according to one embodiment.

FIG. 11 is a schematic of a multi-vehicle platoon shaping for accident avoidance scenario according to one embodiment. For example, consider a group of vehicles 1130, 1170, 1150, 1160, moving on a freeway 1101. Consider now that suddenly, there is an accident ahead of the vehicle platoon in the zone 1100. This accident renders the zone 1100 unsafe for the vehicles to move. The vehicles 1120, 1160 sense the problem for example with a camera, and communicate this information to the vehicles 1130, 1170. The platoon then executes a distributed optimization algorithm, e.g., formation keeping multi-agent algorithm, which selects the best shape of the platoon to avoid the accident zone 1100 and also to keep the vehicle flow uninterrupted. In this illustrative example, the best shape of the platoon is to align and form a line 1195, avoiding the zone 1100.

Figure 12:
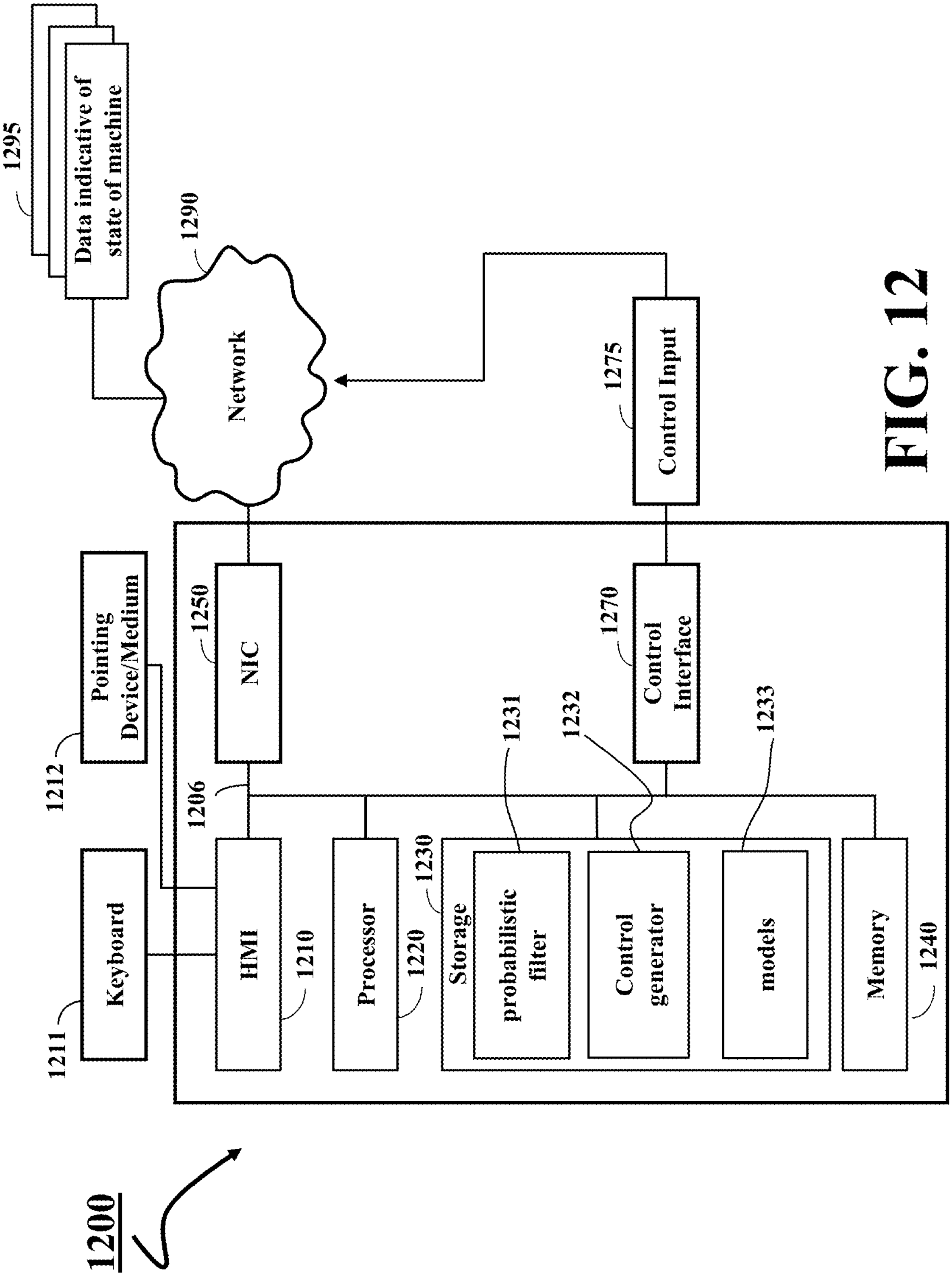
FIG. 12 shows a block diagram of a system for direct and indirect control of mixed-autonomy vehicles in accordance with some embodiments.

FIG. 12 shows a block diagram of a system 1200 for direct and indirect control of mixed-autonomy vehicles in accordance with some embodiments. The system 1200 can be arranged on a remote server as part of RSU to control the passing mixed-autonomy vehicles including autonomous, semiautonomous, and/or manually driven vehicles. The system 1200 can have a number of interfaces connecting the system 1200 with other machines and devices. A network interface controller (NIC) 1250 includes a receiver adapted to connect the system 1200 through the bus 1206 to a network 1290 connecting the system 1200 with the mixed-automata vehicles to receive a traffic state of a group of mixed-autonomy vehicles traveling in the same direction, wherein the group of mixed-autonomy vehicles includes controlled vehicles willing to participate in a platoon formation and at least one uncontrolled vehicle, and wherein the traffic state is indicative of a state of each vehicle in the group and the controlled vehicle. For example, in one embodiment the traffic state includes current headways, current speeds, and current acceleration of the mixed-automata vehicles. In some embodiments, the mixed-automata vehicles include all uncontrolled vehicles within a predetermined range from flanking controlled vehicles in the platoon.

The NIC 1250 also includes a transmitter adapted to transmit the control commands to the controlled vehicles via the network 1290. To that end, the system 1200 includes an output interface, e.g., a control interface 1270, configured to submit the control commands 1275 to the controlled vehicles in the group of mixed-autonomy vehicles through the network 1290. In such a manner, the system 1200 can be arranged on a remote server in direct or indirect wireless communication with the mixed-automata vehicles.

The system 1200 can also include other types of input and output interfaces. For example, the system 1200 can include a human machine interface 1210. The human machine interface 1210 can connect the controller 1200 to a keyboard 1211 and pointing device 1212, wherein the pointing device 1212 can include a mouse, trackball, touchpad, joystick, pointing stick, stylus, or touchscreen, among others.

The system 1200 includes a processor 1220 configured to execute stored instructions, as well as a memory 1240 that stores instructions that are executable by the processor. The processor 1220 can be a single core processor, a multi-core processor, a computing cluster, or any number of other configurations. The memory 1240 can include random access memory (RAM), read only memory (ROM), flash memory, or any other suitable memory machines. The processor 1220 can be connected through the bus 1206 to one or more input and output devices.

The processor 1220 is operatively connected to a memory storage 1230 storing the instructions as well as processing data used by the instructions. The storage 1230 can form a part of or be operatively connected to the memory 1040. For example, the memory can be configured to store an HDES with a first DES and second DES 1231 trained to track the augmented state of mixed-automata vehicles, transform the traffic state into target headways for the mixed-autonomy vehicles; and store a one or multiple models 1233 configured to explain the motion of the vehicles. For example, the models 1233 can include motion models, measurement models, traffic models, and the like.

The processor 1220 is configured to determine control commands for the controlled vehicles that indirectly control the uncontrolled vehicles as well. To that end, the processor is configured to execute a control generator 1232 to determine control commands based on the state of the vehicles. In some embodiments, the control generator 1232 uses a deep reinforcement learning (DRL) controller trained to generate control command from the augmented state for individual and/or a platoon of vehicles.

Figure 13A:
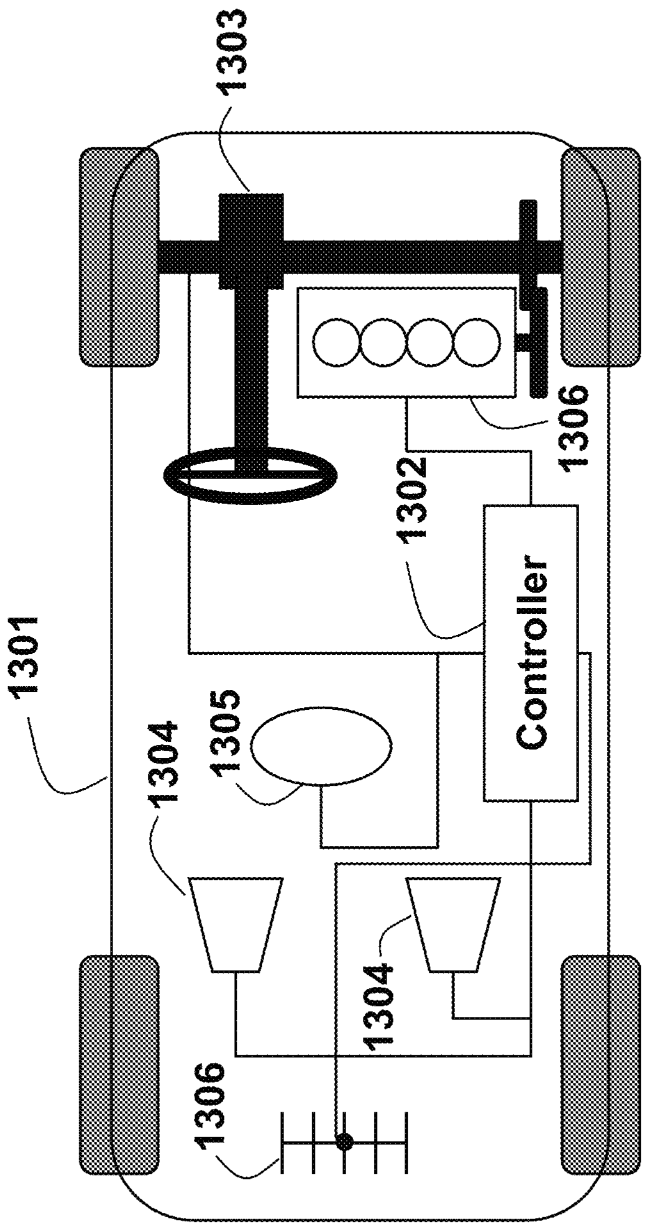
FIG. 13A shows a schematic of a vehicle controlled directly or indirectly according to some embodiments.

FIG. 13A shows a schematic of a vehicle 1301 controlled directly or indirectly according to some embodiments. As used herein, the vehicle 1301 can be any type of wheeled vehicle, such as a passenger car, bus, or rover. Also, the vehicle 1301 can be an autonomous or semi-autonomous vehicle. For example, some embodiments control the motion of the vehicle 1301. Examples of the motion include lateral motion of the vehicle controlled by a steering system 1103 of the vehicle 1301. In one embodiment, the steering system 1303 is controlled by the controller 1302 in communication with the system 1200. Additionally or alternatively, the steering system 1303 can be controlled by a driver of the vehicle 1301.

The vehicle can also include an engine 1306, which can be controlled by the controller 1302 or by other components of the vehicle 1301. The vehicle can also include one or more sensors 1304 to sense the surrounding environment. Examples of the sensors 1304 include distance range finders, radars, lidars, and cameras. The vehicle 1301 can also include one or more sensors 1305 to sense its current motion quantities and internal status. Examples of the sensors 1305 include global positioning system (GPS), accelerometers, inertial measurement units, gyroscopes, shaft rotational sensors, torque sensors, deflection sensors, pressure sensor, and flow sensors. The sensors provide information to the controller 1302. The vehicle can be equipped with a transceiver 1306 enabling communication capabilities of the controller 1302 through wired or wireless communication channels.

Figure 13B:
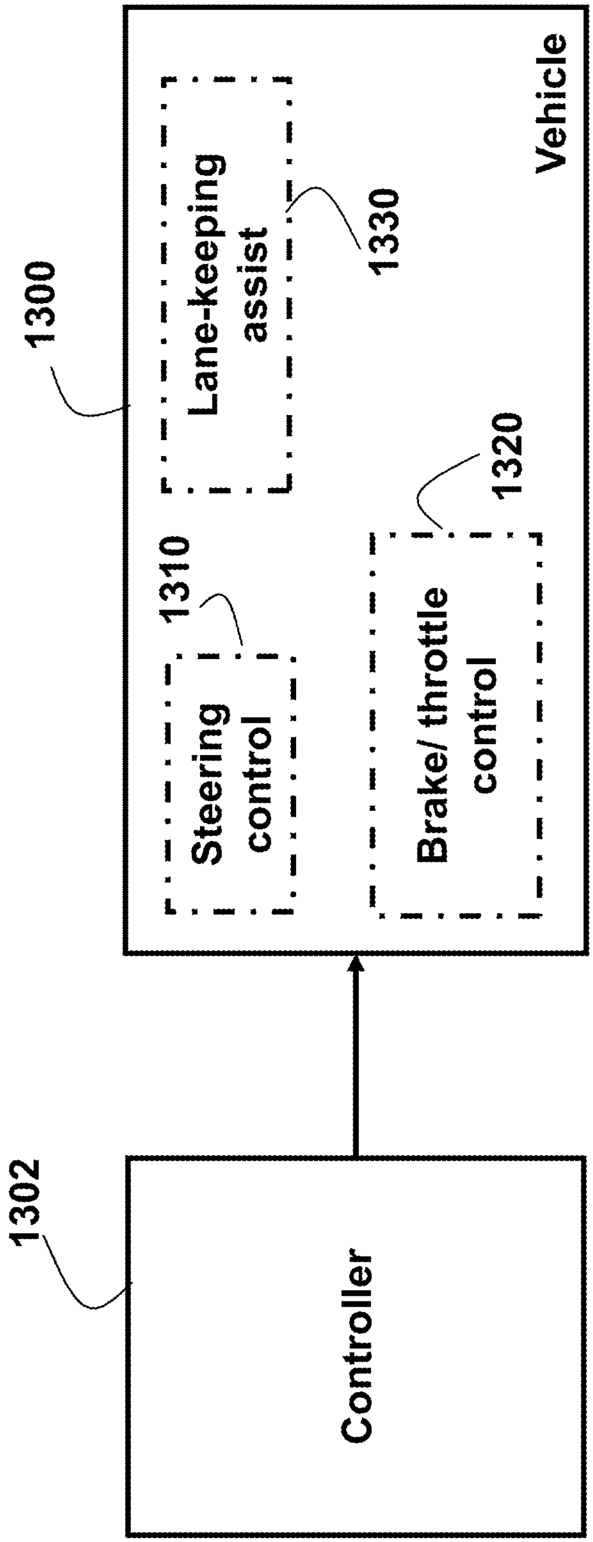
FIG. 13B shows a schematic of interaction between the controller receiving controlled commands from the system and the controllers of the vehicle according to some embodiments.

FIG. 13B shows a schematic of interaction between the controller 1302 receiving controlled commands from the system 1200 and the controllers 1300 of the vehicle 1301 according to some embodiments. For example, in some embodiments, the controllers 1300 of the vehicle 1301 are steering 1310 and brake/throttle controllers 1320 that control rotation and acceleration of the vehicle 1300. In such a case, the controller 1302 outputs control inputs to the controllers 1310 and 1320 to control the state of the vehicle. The controllers 1300 can also include high-level controllers, e.g., a lane-keeping assist controller 1330 that further process the control inputs of the predictive controller 1302. In both cases, the controllers 1300 maps use the outputs of the predictive controller 1302 to control at least one actuator of the vehicle, such as the steering wheel and/or the brakes of the vehicle, in order to control the motion of the vehicle. States $x_t$ of the vehicular machine could include position, orientation, and longitudinal/lateral velocities; control inputs $u_t$ could include lateral/longitudinal acceleration, steering angles, and engine/brake torques. State constraints on this system can include lane keeping constraints and obstacle avoidance constraints. Control input constraints may include steering angle constraints and acceleration constraints. Collected data could include position, orientation, and velocity profiles, accelerations, torques, and/or steering angles.

Figure 14A:
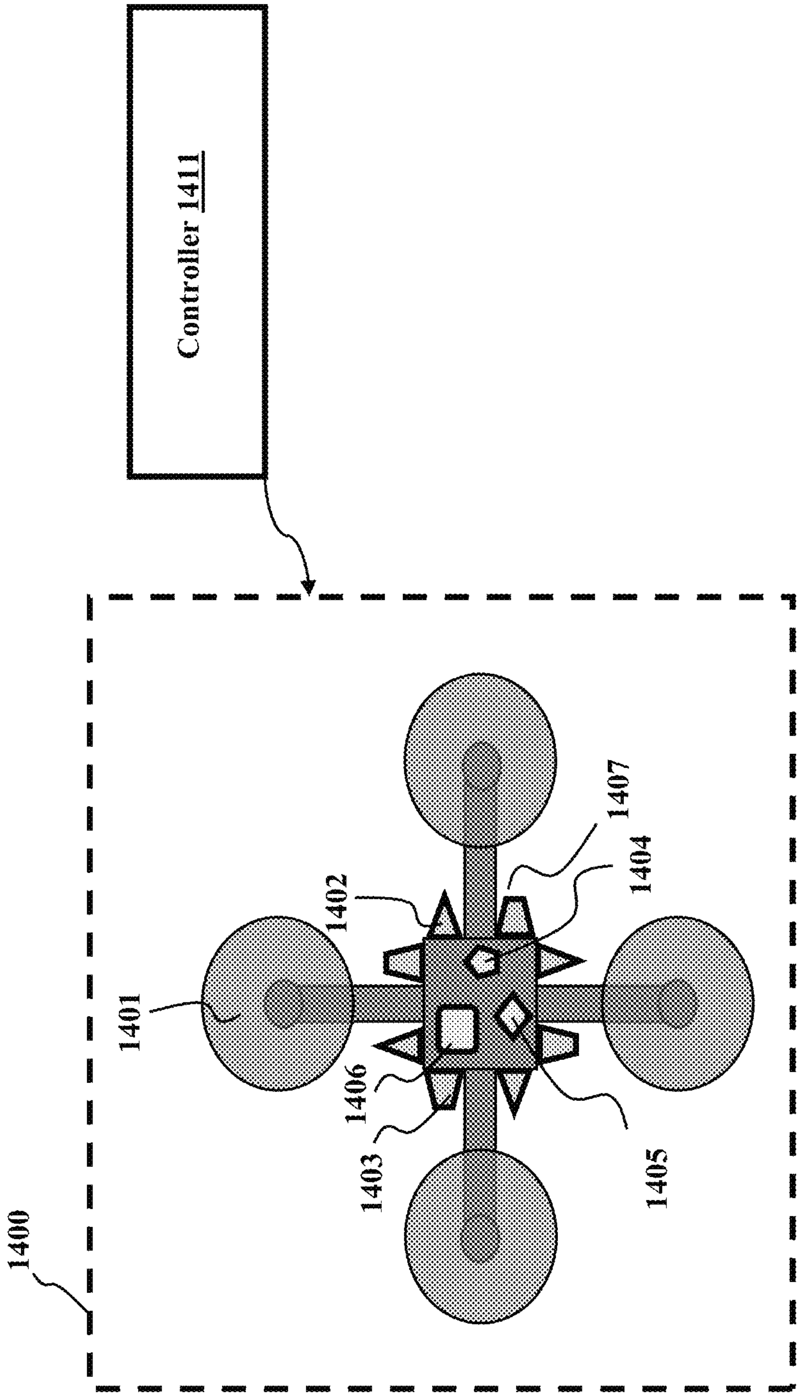
FIG. 14A illustrates a schematic of a controller for controlling a drone according to some embodiments.

FIG. 14A illustrates a schematic of a controller 1411 for controlling a drone 1400 according to some embodiments. In FIG. 14A, a schematic of a quadcopter drone, as an example of the drone 1400 in the embodiments of the present disclosure is shown. The drone 1400 includes actuators that cause motion of the drone 1400, and sensors for perceiving environment and location of the device 1400. The rotor 1401 may be the actuator, the sensor perceiving the environment may include light detection and ranging 1402 (LIDAR) and cameras 1403. Further, sensors for localization may include GPS or indoor GPS 1404. Such sensors may be integrated with an inertial measurement unit (IMU). The drone 1400 also includes a communication transceiver 1405, for transmitting and receiving information, and a control unit 1406 for processing data obtained from the sensors and transceiver 1405, for computing commands to the actuators 1401, and for computing data transmitted via the transceiver 1405. In addition, it may include an estimator 1407 tracking the state of the drone.

Further, based on the information transmitted by the drone 1400, a controller 1411 is configured to control motion of the drone 1400 by computing a motion plan for the drone 1400. The motion plan for the drone 1400 may comprise one or more trajectories to be traveled by the drone. In some embodiments, there are one or multiple devices (drones such as the drone 1400) whose motions are coordinated and controlled by the controller 1411. Controlling and coordinating the motion of the one or multiple devices corresponds to solving a mixed-integer optimization problem.

In different embodiments, the controller 1411 obtains parameters of the task from the drone 1400 and/or remote server (not shown). The parameters of the task include the state of the drone 1400, but may include more information. In some embodiments, the parameters may include one or a combination of an initial position of the drone 1400, a target position of the drone 1400, a geometrical configuration of one or multiple stationary obstacles defining at least a part of the constraint, geometrical configuration, and motion of moving obstacles defining at least a part of the constraint. The parameters are submitted to a motion planner to obtain an estimated motion trajectory for performing the task, where the motion planner is configured to output the estimated motion trajectory for performing the task.

Figure 14B:
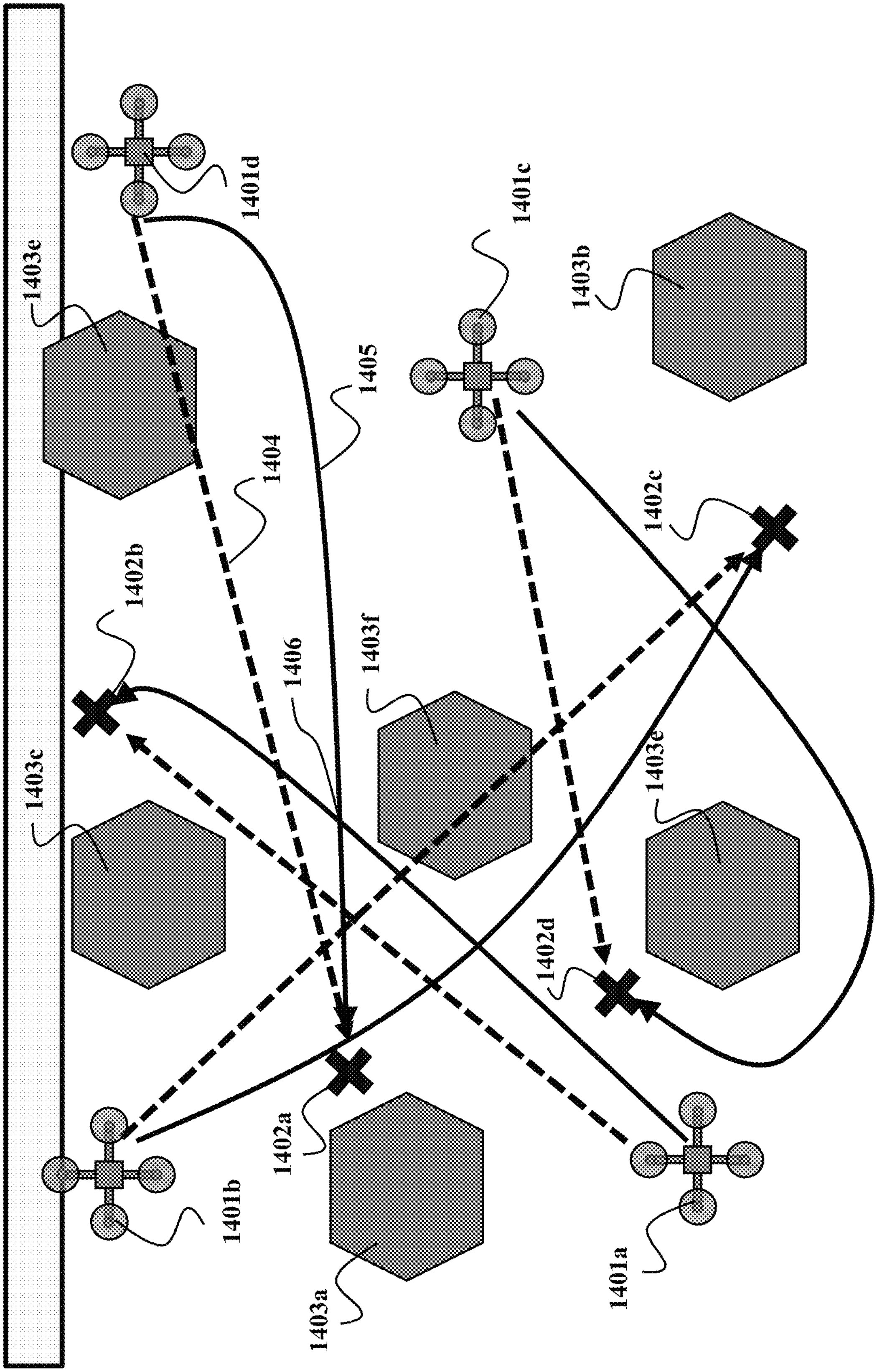
FIG. 14B illustrates a multi-device motion planning problem according to some embodiments of the present disclosure.

FIG. 14B illustrates a multi-device motion planning problem according to some embodiments of the present disclosure. In FIG. 14B, there is shown multiple devices (such as a drone 1401_b_, a drone 1401_a_, a drone 1401_c_, and a drone 1401_d_) that are required to reach their assigned final positions 1402_c_, 1402_b_, 1402_b_, and 1402_d_. There is further shown an obstacle 1403*a*, an obstacle 1403*b*, an obstacle 1403*c*, an obstacle 1403*d*, an obstacle 1403*e*, and an obstacle 1403*f* in surrounding environment of the drones 1401*a*-1401*d*. The drones 1401*a*-1401*d* are required to reach their assigned final positions 1402*a*-1402*d* while avoiding the obstacles 1403*a*-1403*f* in the surrounding environment. Simple trajectories (such as a trajectory 1404 as shown in FIG. 14B) may cause collisions. Accordingly, embodiments of the present disclosure computes trajectories 1405 that avoid obstacles 1403*a*-1403*f* and avoid collision between drones 1401*a*-1401*d*, which can be accomplished by avoiding overlaps of the trajectories, or by ensuring that if multiple trajectories overlap 1406, the corresponding drones reach the overlapping points at time instants in a future planning time horizon that are sufficiently separated.

Figure 14C:
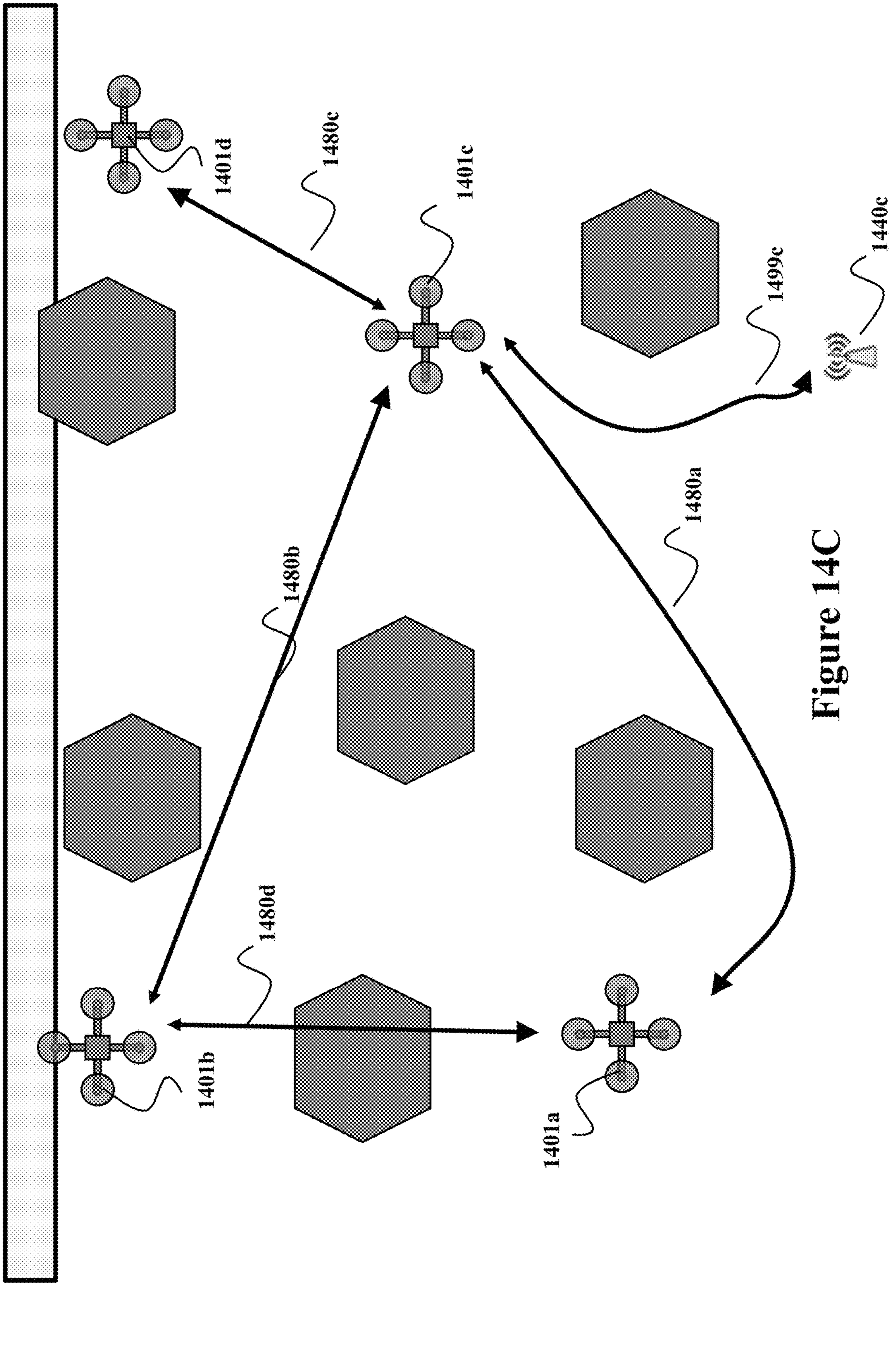
FIG. 14C illustrates the communication between drones used to determine their locations according to some embodiments.

FIG. 14C illustrates the communication between drones used to determine their locations according to some embodiments. For example, drone 1401*b* communicates 1480*b* its range to drone 1401*c*, and also 1480*d* to drone 1401*a*. Drone 1401*a* in its turn communicates 1480*a* its range with drone 1401*c*, who communicates 1480*b* and 1480*c* with drones 1401*b* and 1401*d*. In some embodiments, the communication is done through a symmetrical double-sided two-way ranging (SDS-TWR) method. In some embodiments the drones each estimate its own state and measure the distance to other drones through SDS-TWR. In other embodiments, the state estimation of each drone is done through simultaneous localization and mapping (SLAM).

In other embodiments at least one drone 1401*c* is wirelessly connected 1499*c* via a transmission/receiving interface to remote server 1440*c*. For instance, in one embodiment an HDES is located at 1440*c*, and the communication topology between the drones is part of the first and second type of information.

Figure 15:
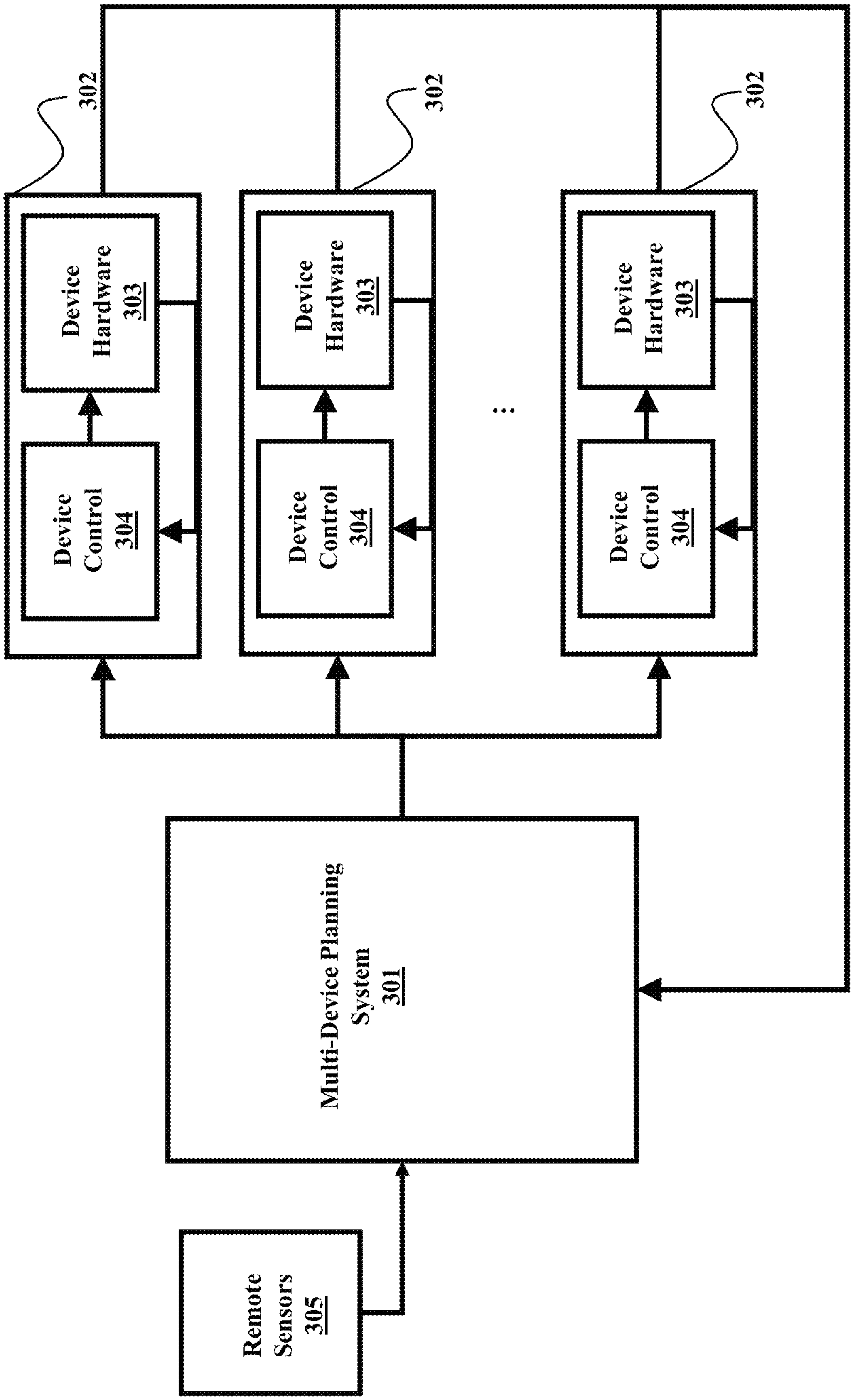
FIG. 15 shows a schematic of components involved in multi-device motion planning, according to the embodiments.

FIG. 15 shows a schematic of components involved in multi-device motion planning, according to the embodiments. FIG. 15 is a schematic of the system for coordinating the motion of multiple devices 1502. The multi-device planning system 1501 may correspond to the controller 1411 in FIG. 14A. The multi-device planning system 1501 receives information from at least one of the multiple devices 1502 and from an HDES 1505 via its corresponding communication transceiver. Based on the obtained information, the multi-device planning system 1501 computes a motion plan for each device 1502. The multi-device planning system 1501 transmits the motion plan for each device 1502 via the communication transceiver. The control system 1504 of each device 1502 receives the information and uses it to control corresponding device hardware 1503.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A hybrid distributed estimation system (HDES) for jointly tracking states of a plurality of moving devices, wherein each of the moving devices is configured to transmit to the HDES over a wireless communication channel one or a combination of measurements indicative of a state of a moving device and an estimation of the state of the moving device derived from the measurements, the HDES comprising:

- a memory configured to store a first distributed estimation system (DES) configured upon activation to jointly track the states of the moving devices based on the measurements of the states of the moving devices and a second DES configured upon activation to jointly track the states of the moving devices based on the estimations of the states of the moving devices;
- a receiver configured to receive over the communication channel multi-type information from the plurality of moving devices, wherein types of the information include one or a combination of a first type for the measurements of the states of the moving devices and a second type for the estimation of the states of the moving devices;
- a processor configured to select between the first type and the second type of information, activate the first DES or the second DES based on the selected type of the information, and jointly estimate the states of the moving devices using the activated DES; and
- transmitter configured to transmit to the moving devices over the communication channel at least one or a combination of the selected type of information and the jointly estimated states of the moving devices.

2. The HDES of claim 1, wherein the processor is configured to select the first type or the second type of the information based on one or a combination of a bandwidth of the communication channel and a number of the moving devices, a correlation among the measurements collected by the moving devices, and an expected difference between joint state estimations of the first DES and the second DES.

3. The HDES of claim 1, wherein the processor is configured to switch between activation and deactivation of the first DES and the second DES based on the selected type of information while initializing an activated DES based on the states estimated by a deactivated DES.

4. The HDES of claim 1, wherein the first DES activated for processing the first type of information is a measurement-sharing Kalman-type filter, and wherein the second DES activated for processing the second type of information is a distributed Kalman filter (DKF) including one or a combination of a consensus-based DKF and a weighted DKF.

5. The HDES of claim 1, wherein the processor tracks a measure of quality of the measurements over time and selects between the first and the second DES by comparing the measure of the quality with a threshold, wherein the measure of the quality of information includes one or a combination of a signal-to-noise ratio (SNR), presence of multipath signals, and confidence of the measurements.

6. The HDES of claim 1, wherein the first DES determines the states of the moving devices based on cross-correlation of measurement noise of the measurements of the states of the moving devices, wherein the cross-correlation of measurement noise is defined by a model of the cross-correlation or determined based on transmitted noise and locations of sensors providing the measurements of the states of the moving devices.

7. The HDES of claim 1, wherein the processor checks availability of cross-correlation of measurement noise of the measurements of the states of the moving devices and selects the first type of information, and activates the first DES when the cross-correlation of measurement noise of the measurements of the states of the moving devices is available.

8. The HDES of claim 7, wherein the processor activates the second DES when the cross-correlation of measurement noise of the measurements of the states of the moving devices is unavailable.

9. The HDES of claim 1, wherein the processor checks availability of cross-correlation of measurement noise of the measurements of the states of the moving devices and selects the first type of information, wherein the processor activates the second DES when the cross-correlation of measurement noise of the measurements of the states of the moving devices is unavailable, and otherwise the processor determines a performance gap between the estimation using the first DES and the estimation using the second DES and activates the first DES or the second DES based on the performance gap.

10. The HDES of claim 1, wherein the processor determines a performance gap between the estimation of the states of the moving devices using the first DES with the first type of information and the estimation using the second DES with the second type of information and activates the first DES or the second DES based on the performance gap.

11. The HDES of claim 10, wherein the processor determines if the moving devices are currently static or currently moving, wherein, when all of the moving devices are currently static, the processor determines the performance gap based on, the processor determines the performance gap based on a performance matrix determined as one or a combination of a measurement model, a joint measurement covariance without a cross-covariance inserted into the joint measurement covariance, and a joint measurement covariance with the cross-covariance inserted into the joint measurement covariance, and wherein, when at least one of the moving devices is currently moving, the processor estimates a first performance of the first DES using a cross-covariance of measurement noise inserted into a joint measurement covariance, estimates a second performance of the second DES, and compare the first performance and the second performance to estimate the performance gap.

12. The HDES of claim 10, wherein the processor selects between activation of the first DES and the second DES based on a weighted combination of the performance gap and a bandwidth of the communication channel.

13. The HDES of claim 1, wherein to initialize the first DES upon its activation, the processor is configured to set a dimension of the joint state of the moving devices according to a number of moving devices and a number of state variables for each of the moving devices;

retrieve from the memory a probabilistic motion model and expand the first probabilistic motion model to the dimension of the joint state;

retrieve from the memory a probabilistic measurement model and expand the first probabilistic measurement model to dimensions of the dimension of the joint state;

retrieve from the memory current estimations of the second DES and transform the current estimations of the second DES into parameters of one or a combination of the probabilistic motion model and the probabilistic measurement model; and initialize one or a combination of the probabilistic motion model and the probabilistic measurement model based on the transformed parameters.

14. The HDES of claim 13, wherein the second DES uses a particle filter, such that the processor transforms values of particles of the particle filter into first and second moments of one or a combination of the probabilistic motion model and the probabilistic measurement model.

15. The HDES of claim 1, wherein to initialize the second DES upon its activation, the processor is configured to set a dimension of the joint state of the moving devices according to a number of moving devices and a number of state variables for each of the moving devices;

retrieve from the memory a communication topology and weights for fusing the received estimates of different moving devices; and retrieve from the memory current estimations of the first DES and transform the current estimations of the first DES into parameters of the second DES; and initialize parameters of the second DES based on the transformed parameters.

16. The HDES of claim 15, wherein the first DES is a probabilistic filter using a probabilistic motion model and a probabilistic measurement model, wherein the second DES uses a particle filter, and wherein the processor samples one or a combination of the probabilistic motion model and the probabilistic measurement model to initialize particles of the particle filter.

17. The HDES of claim 1, wherein the moving devices are vehicles controlled based on their corresponding states transmitted by the transmitter.

18. The HDES of claim 1, wherein the moving devices are vehicles controlled based on their corresponding states as a platoon.

19. The HDES of claim 1, wherein the moving devices include one or a combination of a robot and a drone.

20. A computer-implemented method for jointly tracking states of a plurality of moving devices, wherein the method uses a processor coupled to a memory storing a first distributed estimation system (DES) configured upon activation to jointly track the states of the moving devices based on the measurements of the states of the moving devices and a second DES configured upon activation to jointly track the states of the moving devices based on the estimations of the states of the moving devices, wherein the processor is coupled with stored instructions implementing the method, wherein the instructions, when executed by the processor carry steps of the method, comprising:

receiving over a communication channel multi-type information from the plurality of moving devices, wherein types of the information include one or a combination of a first type for the measurements of the states of the moving devices and a second type for estimation of the states of the moving devices derived from the measurements;

selecting between the first type and the second type of information, activate the first DES or the second DES based on the selected type of the information, and jointly estimate the states of the moving devices using the activated DES; and transmitting to the moving devices over the communication channel at least one or a combination of the selected type of information and the jointly estimated states of the moving devices.

* * * * *